(12) United States Patent
Herrmann

(10) Patent No.: US 11,235,897 B2
(45) Date of Patent: *Feb. 1, 2022

(54) COMPRESSION RING FOR TYING TREE BRANCHES

(71) Applicant: Douglas S. Herrmann, Doylestown, PA (US)

(72) Inventor: Douglas S. Herrmann, Doylestown, PA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/377,283

(22) Filed: Apr. 8, 2019

(65) Prior Publication Data

US 2019/0233144 A1 Aug. 1, 2019

Related U.S. Application Data

(60) Continuation of application No. 15/805,005, filed on Nov. 6, 2017, now Pat. No. 10,252,824, which is a continuation-in-part of application No. 13/951,917, filed on Jul. 26, 2013, now Pat. No. 9,809,337, which is a division of application No. 13/658,888, filed on Oct. 24, 2012, now Pat. No. 8,516,955, which is a division of application No. 12/730,816, filed on Mar. 24, 2010, now Pat. No. 8,347,784.

(51) Int. Cl.
| | | |
|---|---|---|
| *B65B 13/20* | (2006.01) | |
| *B65B 25/02* | (2006.01) | |
| *B65B 11/02* | (2006.01) | |
| *A01G 23/04* | (2006.01) | |

(52) U.S. Cl.
CPC .......... *B65B 11/025* (2013.01); *A01G 23/04* (2013.01); *B65B 13/20* (2013.01); *B65B 25/02* (2013.01)

(58) Field of Classification Search
CPC ....... B65B 11/025; B65B 13/20; B65B 25/02; A01G 23/04
USPC ............ 100/3, 8, 9, 13, 26, 27; 53/529, 530, 53/576, 588, 589
See application file for complete search history.

(56) References Cited

U.S. PATENT DOCUMENTS

| | | | | |
|---|---|---|---|---|
| 4,619,193 A | * | 10/1986 | Crew | ...................... B65B 25/02 100/13 |
| 4,939,989 A | * | 7/1990 | Zacharias | .............. A01G 23/04 100/13 |
| 6,622,620 B1 | * | 9/2003 | Byington | ................ B65B 25/02 100/13 |

(Continued)

*Primary Examiner* — Jimmy T Nguyen
(74) *Attorney, Agent, or Firm* — Joseph E. Maenner; Maenner & Associates, LLC

(57) ABSTRACT

A standing tree baling apparatus includes a main frame and a boom pivotably connected to the main frame. The boom has a first end and a second end. A boom lifter is connected between the main frame and the boom for raising and lowering the boom about a pivot joint at the first end of the boom. A rotation arm has a first arm end and a second arm end. The rotation arm is pivotably connected to the second end of the boom at the first arm end. A driver pivots the arm relative to the boom. A compression ring is sized for loosely encircling a trunk of a standing tree and adapted for forcibly moving a succession of branches of the tree non-destructively inward toward the trunk of the tree as the ring is raised about the tree to facilitate baling of the tree with rope line. The ring is connected to the second arm end.

20 Claims, 25 Drawing Sheets

(56) References Cited

U.S. PATENT DOCUMENTS

| | | | |
|---|---|---|---|
| 7,086,435 B1 * | 8/2006 | Coulbourn, Jr. | A01G 23/08 144/24.13 |
| 7,373,960 B1 * | 5/2008 | Westbrook | A01G 23/093 144/208.3 |
| 8,347,784 B2 * | 1/2013 | Herrmann | B65B 11/025 100/13 |
| 8,516,955 B2 * | 8/2013 | Herrmann | B65B 25/02 100/13 |

* cited by examiner

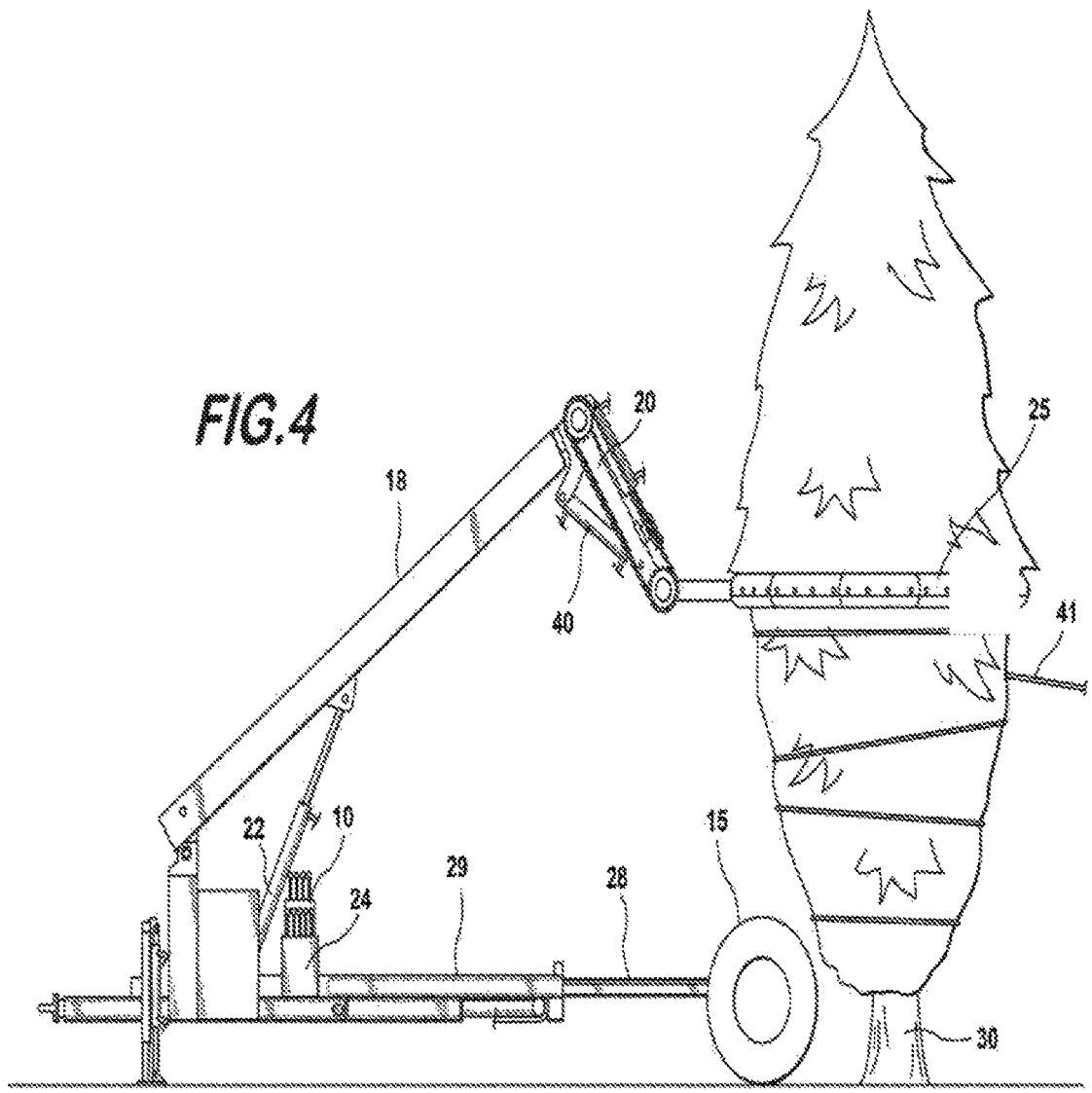

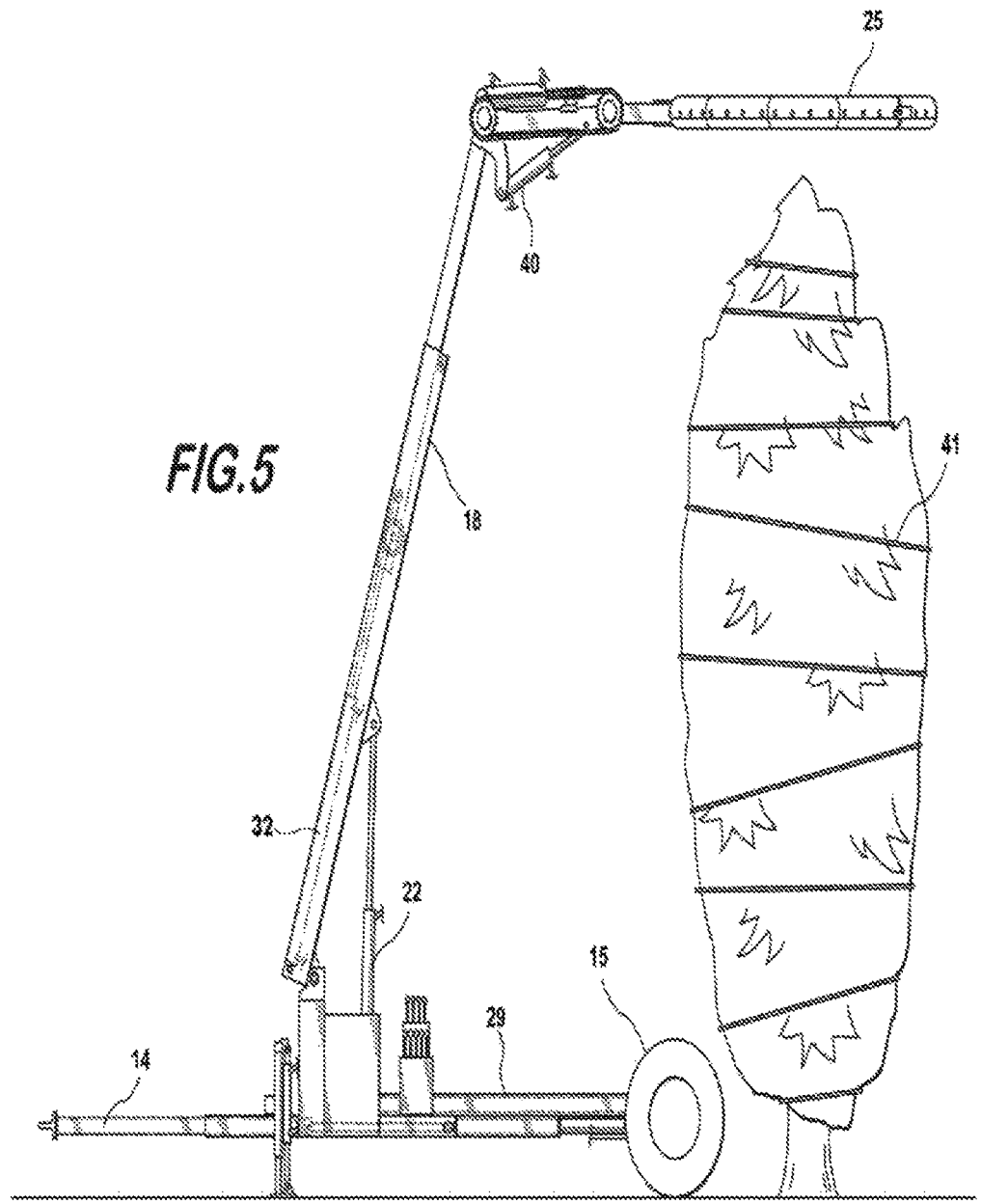

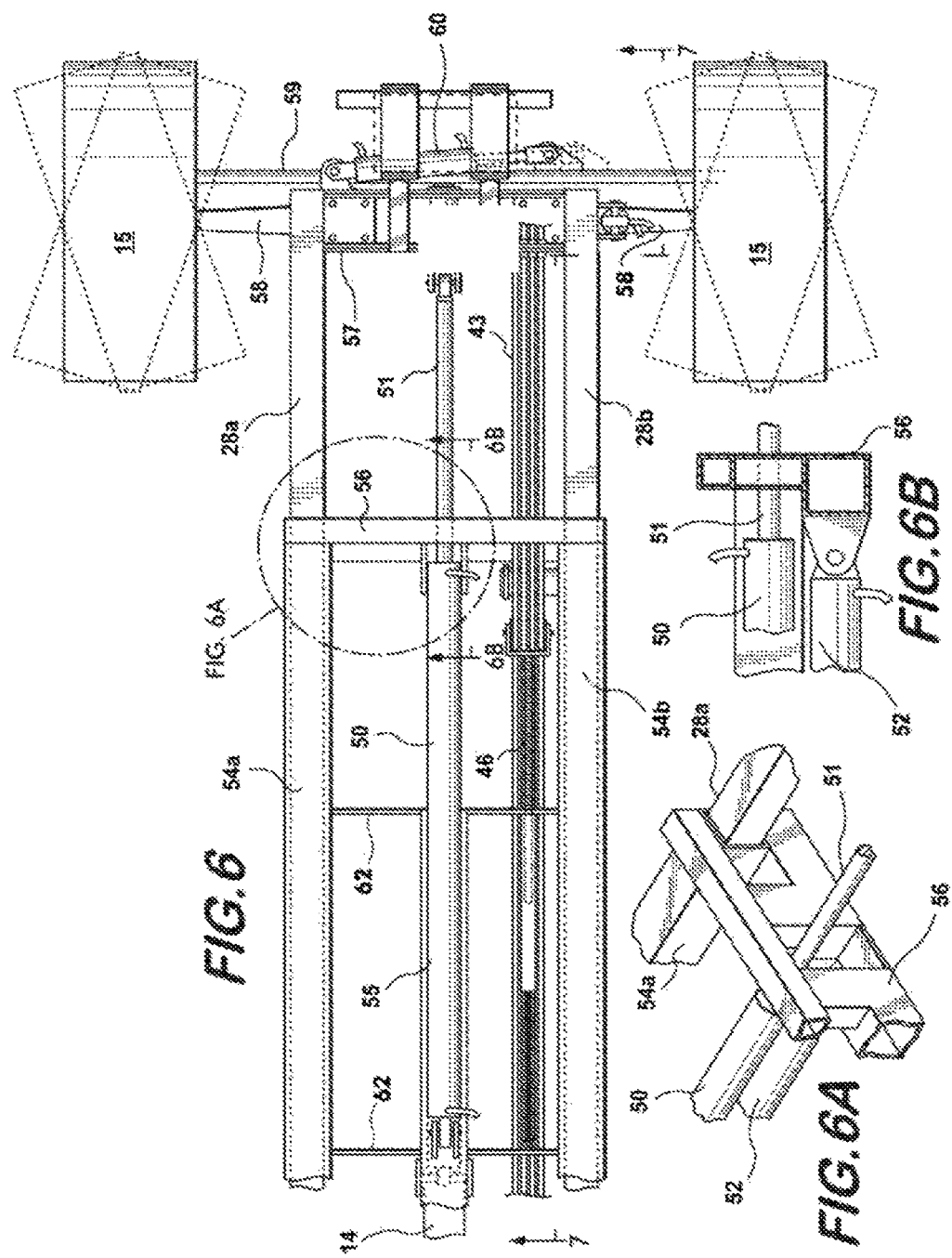

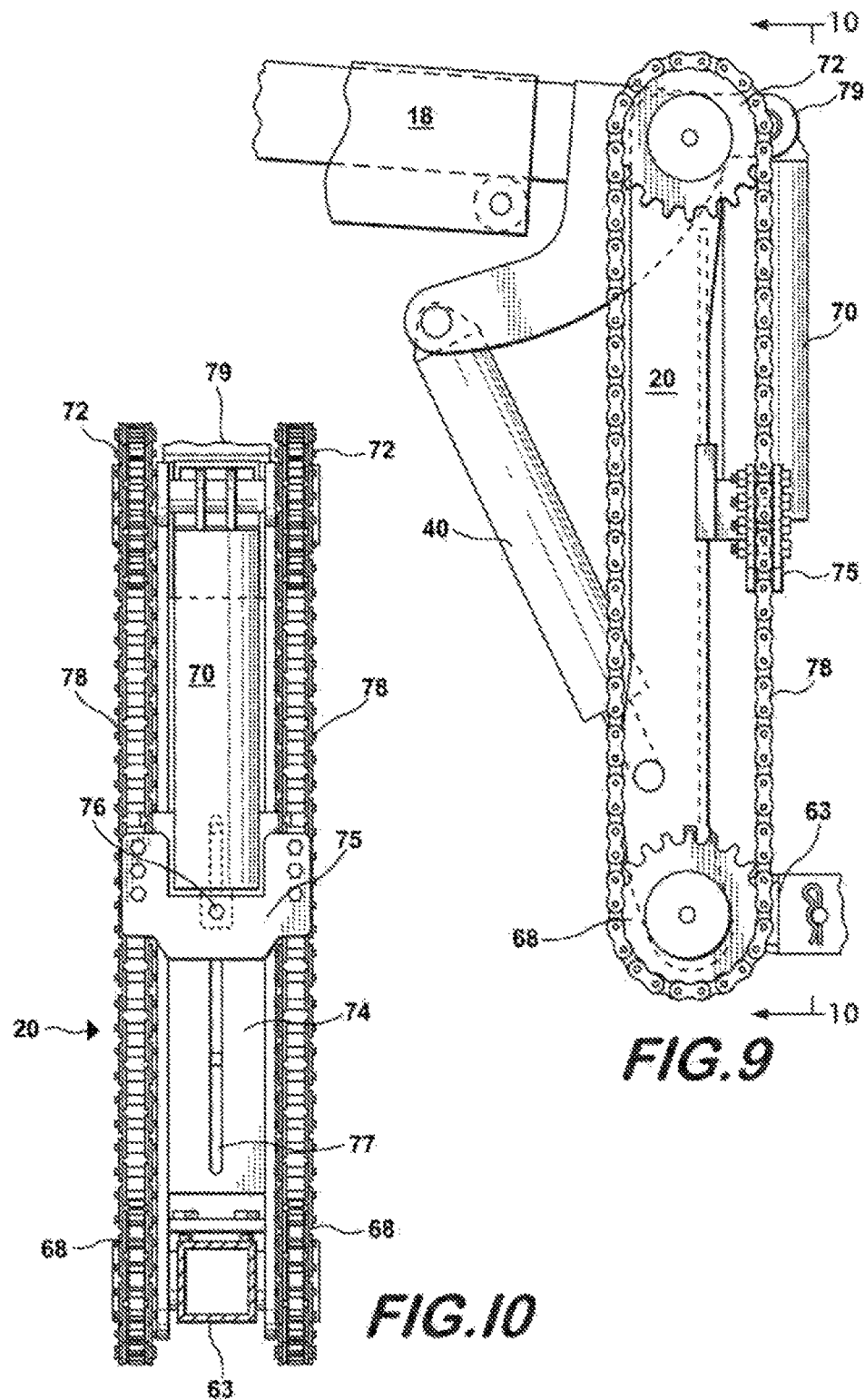

COMPRESSION RING FOR TYING TREE BRANCHES

CROSS-REFERENCE TO RELATED APPLICATIONS

This patent application is a continuation of U.S. patent application Ser. No. 15/805,005 entitled "Standing Tree Baler" filed Nov. 6, 2017, and issued on Apr. 9, 2019 as U.S. Pat. No. 10,252,824, which is a Continuation-in-Part of U.S. patent application Ser. No. 13/951,917 entitled "Standing Tree Compression Ring", filed Nov. 28, 2013 and issued on Nov. 7, 2017 as U.S. Pat. No. 9,809,337, which is a divisional of patent application Ser. No. 13/658,888 entitled "Standing Tree Baler" filed Oct. 24, 2012 and issued Aug. 27, 2013 as U.S. Pat. No. 8,516,955, which is a divisional of Ser. No. 12/730,816 entitled "Standing Tree Baler" filed Mar. 24, 2010 as U.S. Pat. No. 8,347,784 issued Jan. 8, 2013, which are all incorporated herein in their entireties by reference.

FIELD OF THE INVENTION

The present invention relates to a device used for compressing the branches of a standing tree in preparation for tying the branches in an upwardly folded condition. More specifically, the invention relates to a compression ring used in conjunction with a standing tree baler.

BACKGROUND OF THE INVENTION

Tree baling is well known in the field of handling commercial nursery stock. In many cases, it is advantageous to bale the trees while they are standing prior to their felling or transplanting. Well known devices for baling trees include the use of a vertically extensible compression ring initially positioned around the lowest tree branches and moved upwardly against the undersides of the branches pressing them inwardly. As they are held compressed, baling rope is applied to the outside of the branches in a circling spiral fashion to hold the branches in the compressed condition. Trees which are tied up or baled in this way are easier to handle and transport with less damage to the tree. Baling trees in this way also provides greater working space around the tree for digging.

Various prior art patents disclose tree baling equipment of the above-mentioned type. They include U.S. Pat. No. 4,619,193 entitled "Standing Tree Baler" issued to Crew; U.S. Pat. No. 4,939,989 entitled "Tree Limb Folding and Tying Apparatus" issued to Zacharias; and U.S. Pat. No. 6,945,163 entitled "Standing Tree Baler" issued to Squires. While the currently available tree balers including those disclosed in the above-mentioned patents have been used for this purpose, they are large, complicated and consequently expensive pieces of equipment which are difficult to use and often damage the tree branches.

Tree balers are most commonly used in a tree nursery environment where the trees are planted relatively close together in rows. Therefore, obtaining close access to the tree is always a problem especially when large bulky equipment is used. Furthermore, heavier equipment often bogs down in muddy or wet soil conditions. Because large trees require the powerful force necessary to compress the tree limbs, the current thinking is that this type of heavy and complicated equipment is required. It is also difficult for large equipment to position the compression ring close to the ground. Maintaining the proper alignment of the ring about the tree as it is moved upwardly is rarely achieved by high-reach equipment. All of these deficiencies require additional labor and therefore are expensive. The goal of baling very large trees is to compact their branches so that their overall width is within legal limits for transporting on the highway.

There is therefore a need in the art for a lightweight, maneuverable yet sturdy and powerful high-reach tree baler that is sufficiently robust to handle the force required to bale large standing trees so that they are condensed to a size legal for highway transport.

SUMMARY OF THE INVENTION

In order to meet the needs in the art for an improved standing tree baler, the present apparatus has been devised. To provide a lightweight apparatus, one embodiment of the invention has been constructed as a towable, trailered baler, which as described in detail below has independent maneuvering capabilities so that it can achieve a close working position next to the tree. To achieve the structural strength required for baling large trees, a novel telescoping wheeled frame has been devised. This novel framework provides a ground support directly underneath the ring next to the tree trunk and hence provides a strong structural foundation for pushing the ring upward. This is in contrast to the prior art equipment in which the tree branch compression ring and related lifting structures are cantilevered over the back end of a hauling vehicle requiring a heavy counterweight. Thus, the present invention's approach to constructing a standing tree baler is conceptually very different from the prior art.

In addition to this novel trailer and frame configuration, the present apparatus includes many other unique features which add to its efficiency and ease of use. For example, the lifting boom utilizes an interconnecting rotation arm between the end of the boom and the compression ring so that the ring may be positioned at a very low starting point close to the ground around the base of the tree trunk, and accurately moved upwardly with the circumference of the ring being held level and centered as the ring is moved upward. With the present invention, this horizontal orientation can be easily maintained as the center of the ring follows the axis of the tree as it is pushed upward to the top. The inability of high lift prior art devices to position the tree branch compression ring close to the ground beneath the lowest tree branches is a major failing of prior art apparatus. The rotation arm provides a double-jointed support of the compression ring that not only more accurately controls its properly aligned upward movement, but also because of its range of movement provides a compacted folded up condition of the boom and compression ring for ease of transportation.

To further accommodate the flexibility of use and to better achieve proper alignment of the compression ring, a unique frame suspension system has been devised so that support wheels may be both steered and tilted. A steering mechanism provides added maneuverability while a tilt mechanism allows stable placement and centering of the apparatus on uneven ground. Yet another aspect of the invention is a compression ring that includes a specialized lining material which has proven to greatly reduce tree limb damage due to friction between the tree limb bark and the force-applying surface of the ring. The added benefit of reduced friction is a lower power requirement and therefore greater efficiency. Advantageously, the liner is releasably affixed to the outer surfaces of the ring which makes economical the initial fabrication as well as any continuing maintenance or replacement needed. Applicant's discovery of this material for this use is an important aspect of the invention. Other features of the compression ring also contribute to its ease of use and allow "double tying" of larger trees which will be discussed in more detail below.

More specifically, the Applicant has invented a tree branch compression apparatus with a main frame and at least two wheels affixed to a sub-frame rollably supporting the main frame and being located at an extreme trailing end of the apparatus. The sub-frame is in telescoping engagement with the main frame and extends and retracts the wheels carried by the sub-frame which may be positioned beneath the compression ring during its operation. The main frame also includes a forwardly extending tongue rail in sliding engagement with the main frame with means to extend and retract it. The ring includes a liner releasably affixed around its external operative surface to reduce the friction of the ring against the tree branches. Access to the interior of the ring for positioning around the tree is provided by a releasable segment. The ring is vertically extendable by a boom connected to the front of the main frame at a pivot joint. A hydraulic boom lifter is connected between the main frame and the boom for raising and lowering the boom about the pivot joint. A rotation arm is pivotably connected to the end of the boom at a first end of the arm. The ring is rotatably connected to a second end of the arm and includes drive means on the arm for independently rotating the ring in a vertical plane relative to the arm. All of the means for driving the various components of the invention are hydraulic cylinders controlled by a hydraulic pump and operator controls on the main frame. The invention further includes hydraulic line routing means for supporting the lines on the main frame and sub-frame in a manner such that the length of the path of the hydraulic lines remains substantially constant as the rear wheels are retracted or extended with respect to the main frame.

In accordance with the foregoing, one object of the invention is to provide a lightweight yet structurally strong standing tree baler apparatus which is compact and highly maneuverable.

It is another object of the invention to provide a standing tree baler which allows the maximum controlled range of motion of the baling ring while allowing structural ground support directly beneath the ring.

It is yet another object of the invention to provide a baling ring with reduced friction characteristics to avoid damage to tree branches.

It is yet another object of the invention to provide a standing tree baler that is economical to use and compactable for ease of transport as a trailered vehicle.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a right side elevation view showing operation of the apparatus.

FIG. 5 is a right side elevation view showing the completed operation of the apparatus.

FIG. 6 is a top plan view of the support frame with alternate positions of the steerable wheels shown in phantom.

FIG. 6A is a top right rear isometric view of the support frame slide assembly and drive cylinder.

FIG. 6B is a right side sectional view taken from FIG. 6 as shown in that Figure.

FIG. 9 is a right side elevation view of the rotation arm mechanism.

FIG. 10 is a rear view taken from FIG. 9 as shown in that Figure.

DESCRIPTION OF THE INVENTION

Figure 1:
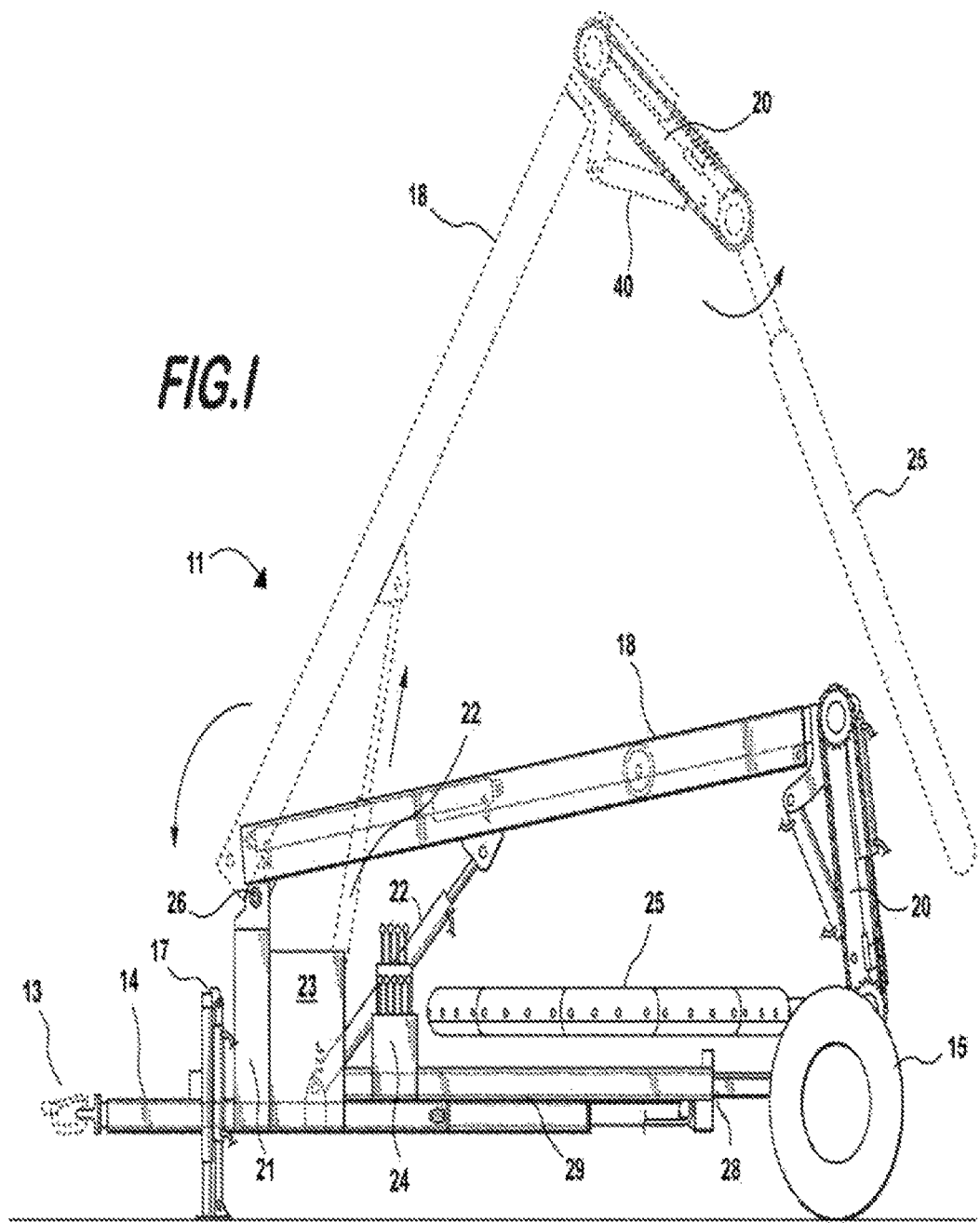
FIG. 1 is a right side elevation view with an alternate raised position of the apparatus shown in phantom.

Referring now to FIG. 1, one embodiment of the tree baler of the invention 11 is constructed in towable trailer configuration with a hitch 13 at the front of a leading end rail 14 and wheels 15 at a trailing end. As depicted, the trailer is unhitched and supported adjacent the leading end by a jack stand 17. In this Figure, the apparatus is shown in its compacted stowed position for transport, and a partially extended position is shown in phantom. Referring to the components of the apparatus in their partially extended position, the apparatus includes a telescoping main boom 18 which supports an articulated rotation arm 20 that in turn pivotably supports the tree branch compression ring 25. The base of the boom is pivotably supported at joint 26 on a main support post 21 and is lifted by hydraulic cylinder 22. A single boom is preferred in that the pivot joint 26 inherently provides an amount of lateral freeplay which permits the ring to self-adjust in response to the force of the tree branches being compressed as they are lifted by the ring. Likewise, the rotation arm is pivotably moved with regard to the boom by hydraulic actuator 40. These hydraulic systems are driven by a pump and fluid reservoir 23 regulated by fluid valves and control levers at station 24. These various components are supported by a unique telescoping frame which will be discussed in more detail below.

Figure 2:
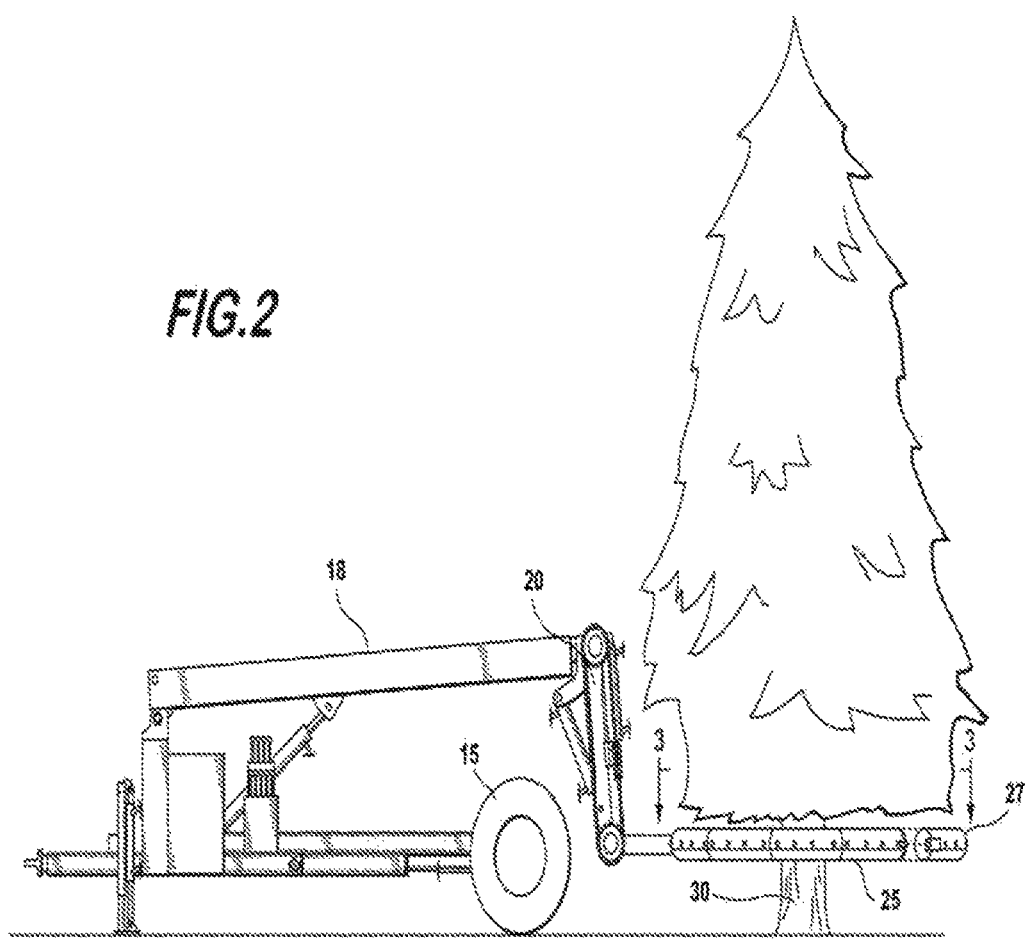
FIG. 2 is a right side elevation view in position with a tree to be baled.

Referring now to FIG. 2, the apparatus of the present invention is shown in its starting operative position. The compression ring 25 has been placed around a tree trunk 30, access being first provided by the removal of releasable ring segment 27 which is then replaced. The boom 18 is in a low position with the rotation arm 20 pointing downward so that the ring is horizontally supported close to the ground and in fact the boom can be lowered so that the ring can rest on the ground if needed. As seen in this Figure, the ring 25 may be positioned close to the ground below the height of the transport wheels 15. This is an important aspect of the invention which allows the apparatus to be used with standing trees having limbs close to or on the ground. The releasable ring segment 27 is shown in more detail in FIG. 3.

Figure 3:
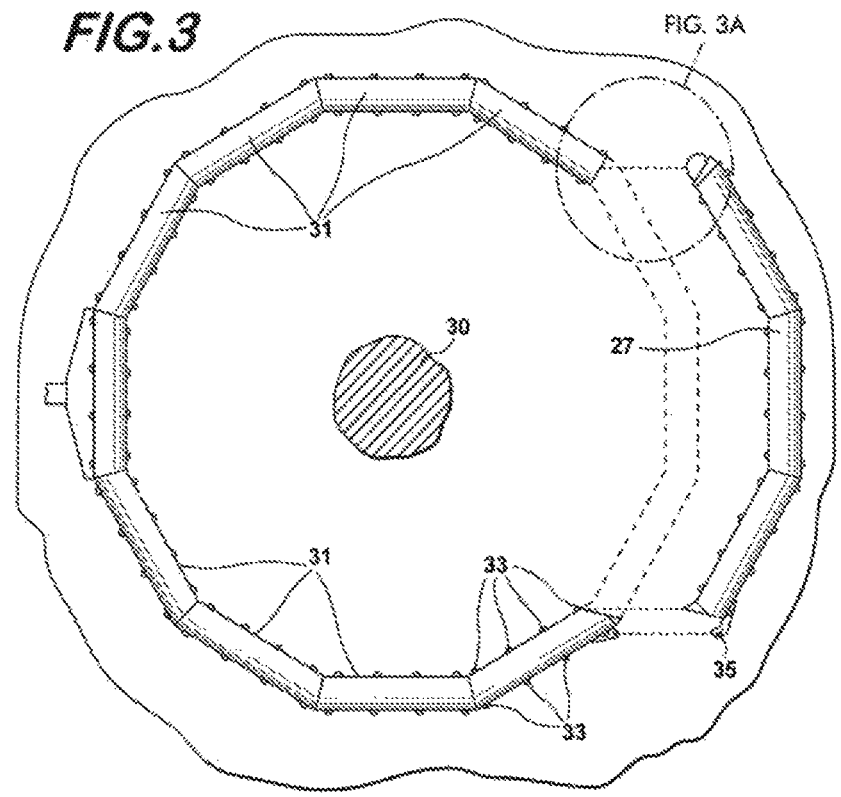
FIG. 3 is a top plan sectional view of the compression ring with the access segment removed, its assembled position being shown in phantom.
Figure 3A:
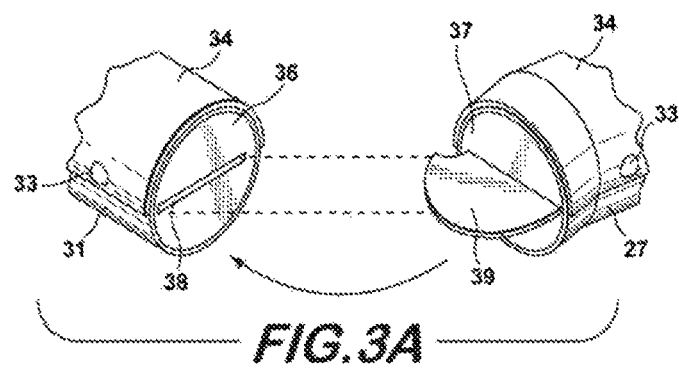
FIG. 3A is a top front isometric view taken from FIG. 3 as shown in that Figure which depicts the ring access connecting joint.

Referring now to FIG. 3, the inner structure of the ring is polygonal and made of a series of interconnecting straight sides 31. The compression ring is positioned around tree trunk 30 which is centered in the middle of the ring. The releasable ring segment 27 is attached at a closure end by releasable latch 35. The other hinge end of the releasable segment is a tongue and slot joint shown in more detail in FIG. 3A. As shown in FIG. 3A, each of the ring sides 31 including those of the releasable ring segment 27 includes a top-facing liner 34 which is secured to the segments by rivets 33. The hinge joint end of the releasable ring segment is secured by tongue and slot engagement. The segment end of the hinge joint includes segment end plate 37. The ring end of the hinge joint includes ring end plate 36. Ring end plate 36 includes slot 38, and segment end plate 37 includes tongue 39 which matingly engages the slot 38 when the two ends are brought together. By this hinge and latch joinder of the segment, it will be appreciated that the segment may be fully released away from the remainder of the ring and then securely replaced as needed.

The releasable ring segment allows for an alternate "double tying" method of baling larger trees. Rather than beginning at the base of the tree as shown in FIG. 3, the ring may be positioned around the tree trunk midway up the tree. The ring is then moved upwardly and the upper branches of the tree are tied first. Then the ring is moved to its lower position to tie up the lower branches. This sequence provides space above the lower branches so they can be lifted and compressed inwardly more easily.

The composition of the liner material is preferably a polyethylene polymer plastic. In particular, the preferred plastic is one of the Tivar® 1000 plastics produced by the Quadrant company located at 2120 Fairmont Avenue, P.O. Box 14235, Reading, Pa. 19612. More specifically, the preferred material with the lowest coefficient of friction is Quadrant Tivar® Dryslide which has a coefficient of friction of 0.08. The polyethylene polymer plastic material suitable for this embodiment is applied to the compression ring in ⅛ inch sheets, cut and affixed by rivets 33 as shown in this Figure. Any color of the liner material is acceptable except black, which has been found to absorb too much solar radiation and become too hot, which can damage the tree. As another example, non-black and Tivar® 88 is suitable for use with the present invention. As employed in this embodiment, the liner material exhibits some flexibility and resilience which spreads the force against the tree branches and helps prevent damage.

Referring now to FIG. 4, the apparatus is shown in an intermediate position of operation with the compression ring 25 lifted around the tree. It can be seen from this Figure that the telescoping sub-frame 28 has been extended so that the frame support wheels 15 are now positioned beneath the ring close to the tree trunk 30. The wheels 15 are extended as soon as the ring clears the height of the wheels. Extending the wheels provides the strongest possible structural configuration which can support the force load of the branches against the compression ring with minimal chance of tipping the trailer. This allows the use of a lighter weight trailer than would otherwise be possible with other configurations in which the compression ring is severely cantilevered beyond the end of the support vehicle, which then requires heavy counter-weighting to prevent tipping. As shown in this Figure, as the ring is moved upward around the tree, the boom 18 is pivoted upward as hydraulic cylinder 40 is extended. The various hydraulic actuators (22, 40) are controlled so that the boom and rotation arm 20 support the compression ring in a horizontal orientation as it operates on the tree. The controls are lever-operated hydraulic valves 10 located at station 24.

Referring now to FIG. 5, the ring 25 has been extended above the top of the tree after baling of the tree with rope line 41. Typically, the baling line is spiral wound manually around branches of the tree just beneath the ring in stepwise fashion as the ring is moved vertically up around the tree. As shown in this Figure, the boom 18 is fully rotated upward and telescopically extended by cylinder 32 to provide sufficient reach above the top of the tree. The rotation arm 20 has been pivoted slightly with regard to the boom and the compression ring 25 has been rotated clockwise, now substantially in line with the rotation arm. Also seen in this Figure, the tongue rail 14 at the leading end of the trailer has been extended and the transport wheels 15 maintained in their same position by retracting the sub-frame back into the main frame 29. In this way, the hitch-to-wheel distance remains constant while bringing the base of the boom and the support jack closer to the tree to achieve the greatest possible vertical reach and greater structural support with the least chance of tipping the frame. Thus, by controlling the hydraulic cylinders the sub-frame and tongue rail may be positioned in a variety of ways to achieve the best possible structural support while allowing accurate placement of the ring throughout its upward movement.

Referring now to FIG. 6, the mechanisms which allow the unique telescoping of the frame members is shown. The rearward extending sub-frame consists of two parallel frame members 28a and 28b constructed of inter-fitting square tubing. The forwardly extending tongue rail 14 together with the sub-frame provide a dual telescoping structure with two separate telescoping sections, one forward and one aft, each moved individually by separate hydraulic cylinders 50 and 52. Each telescoping assembly includes a suitable bearing material between the moving elements. In this embodiment, the cylinders 50 and 52 are stacked, one above the other as shown in FIGS. 6A-6B. The top cylinder 50 and associated piston rod 51 move the sub-frame framework 57 which carries the wheels 15 and their hydraulically controlled steering and suspension system. The wheels are pivotable at the ends of axle 58 and are steered by tie rod 59 that is actuated by hydraulic cylinder 60.

Figure 7:
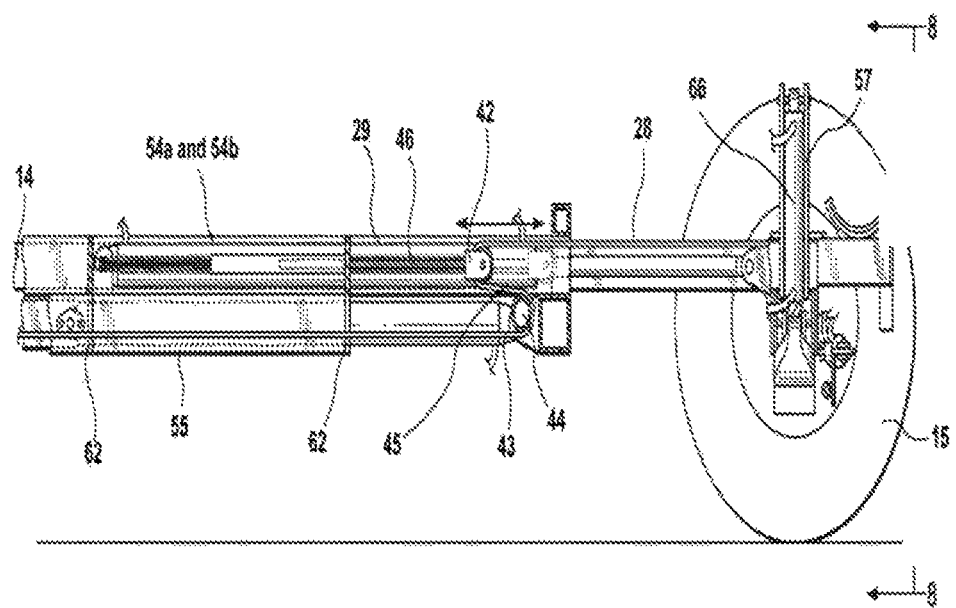
FIG. 7 is a right side elevation sectional view taken from FIG. 6 as shown in that Figure.

As shown in FIG. 6b and further in FIG. 7, a lower cylinder 52 moves an extendible tongue rail 14 that can move all of the frame components rearward if the towing hitch is held stationary. As discussed with respect to FIG. 5, this is done in conjunction with retraction of the sub-frame to keep the wheels in position next to the tree trunk. This permits movement of the boom with respect to the tree when the tongue rail is hitched to a support structure such as the rear of a hauling vehicle. It will be appreciated by those in the mechanical arts that with these telescoping mechanisms, the main frame, support wheels and hitch tongue rail may achieve a variety of positions as needed.

Referring further to FIGS. 6 and 7, one inventive aspect of the apparatus is the routing of the various hydraulic lines which control movement of the wheel suspension components. Typically, the hydraulic hoses, connections, couplings and their joints represent the greatest weaknesses in the apparatus which require the most maintenance. In order to properly support the hydraulic lines which run to the rear suspension and steering components of the wheels from the frontally located control valves, a unique system of line routing has been devised. As shown in FIGS. 6 and 7, each hydraulic line 43 follows a serpentine path at the end of the main frame 29 around two guides, a tubular guide 44 on the main frame 29 and a spring-biased pulley 42 at the overlapping end of the sub-frame 28 which supports the rear wheels. This forms a reverse direction run 45 in the middle of the lines which expands at the same rate as the ends of the lines come together. Thus, the length of the path of the hydraulic lines remains substantially constant as the rear wheels are retracted or extended with respect to the main frame while spring maintains a tension on the lines. This configuration controls the support of the hydraulic lines and holds them close to the frame which protects them from damage or entanglement with surrounding brush often found in their operating environment.

Referring further to FIGS. 6 and 7, greater detail of the main frame 29 and retractable sub-frame 28 which carries the wheel suspension system is shown. The main frame comprises square tubular rails 55, 54a and 54b which receive dimensionally corresponding inner-telescoping members, namely one single, centered, forwardly extending tongue rail 14 and two side-by-side sub-frame rails 28a and 28b which are connected by cross members 62 and 56. As shown in these Figures, the serpentine routing of the hydraulic lines around main frame guide 44 and sub-frame rail pulley 42 is shown. The pulley is spring-biased in the direction of the main frame in order to maintain tension on the hydraulic lines 43. It will be appreciated by those of skill in the art from these mechanical relations that as the sub-frame is retracted and extended the length of the hydraulic lines is substantially constant and tension is maintained by the spring 46. Also shown in these Figures is the wheel suspension system which includes the tilt-controlling hydraulic cylinder 66 that is secured at one end to the sub-frame framework member 57 and a bottom end to the axle 58 which connects both wheels 15 as shown in greater detail in FIG. 8.

Figure 8:
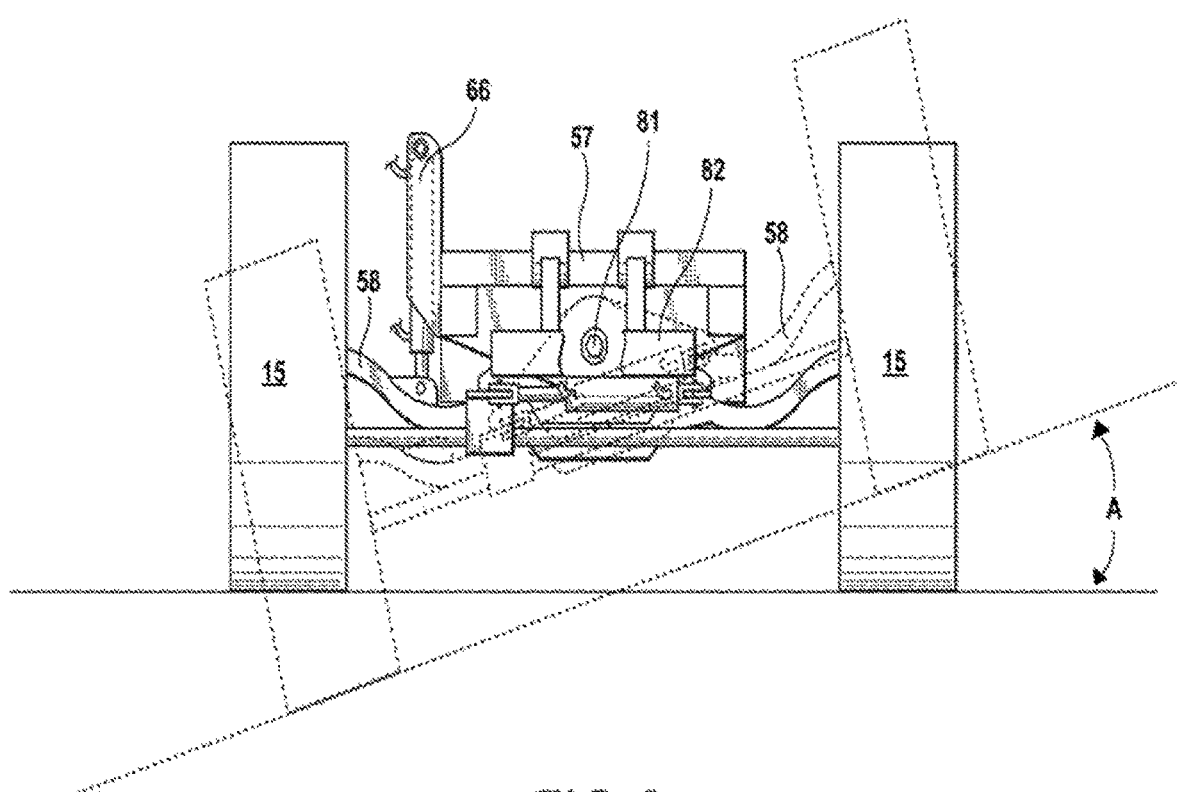
FIG. 8 is a rear view taken from FIG. 7 as shown in that Figure.

Referring now to FIG. 8, the hydraulic systems of the rear wheel suspension are shown in more detail. The steering assembly which carries the wheels pivots about horizontal joint 81 and can be moved and held in selected angular positions in the vertical plane, one extreme position of tilt to one side being shown in this Figure in phantom as angle A. The angle of tilt is controlled by hydraulic cylinder 66. Permitting the wheels 15 to tilt allows the ring-lifting apparatus to be level and stably supported on uneven or sloping ground. As shown in this Figure, the entire steering assembly is mounted on the same pivoting bracket 82 so that steering the wheels maybe controlled independently of the tilt mechanism. The tilt mechanism can be controlled to ensure that the ring remains concentric with the trunk and branches of the tree as it is lifted even when the baler is supported on uneven ground.

Referring now to FIGS. 9 and 10, the rotation arm 20 which is pivotably connected to the boom 18 is moved by hydraulic cylinder 40. A compression ring support rod 63 is connected to the bottom end of the rotation arm and is rotatably controlled by a chain and sprocket mechanism. The ring by way of rod 63 is rotated by drive sprockets 68 that are in turn rotated by movement of the chain 78 which is driven by hydraulic cylinder 70. Cylinder 70 is supported at the stationary end by a bracket 79 affixed to the arm, while the moving piston of the cylinder at the opposite end is connected to follower 75. Idler sprockets 72 maintain tension on the chain drive mechanism which operates in both directions. A follower 75 rides along a guide plate 74 across the top of the arm 20 and is pinned by pin 76 to a slot 77 in the guide plate 74 to restrict the movement of the follower to a linear path between and parallel to the chain. The follower is attached on opposite sides to the chains 78 which encircle and are engaged with the drive sprockets 68. Thus, the linear motion of hydraulic cylinder 70 is translated to rotary motion of the drive sprockets 68 that rotate the compression ring support rod 63 and hence the compression ring through its range of angular positions. By these mechanical relations, the compression ring can be rotated throughout a range greater than 180.degree., which allows the ring to be folded backwardly beneath the boom to achieve a compacted stowed position for transport as shown in FIG. 1.

Figure 11:
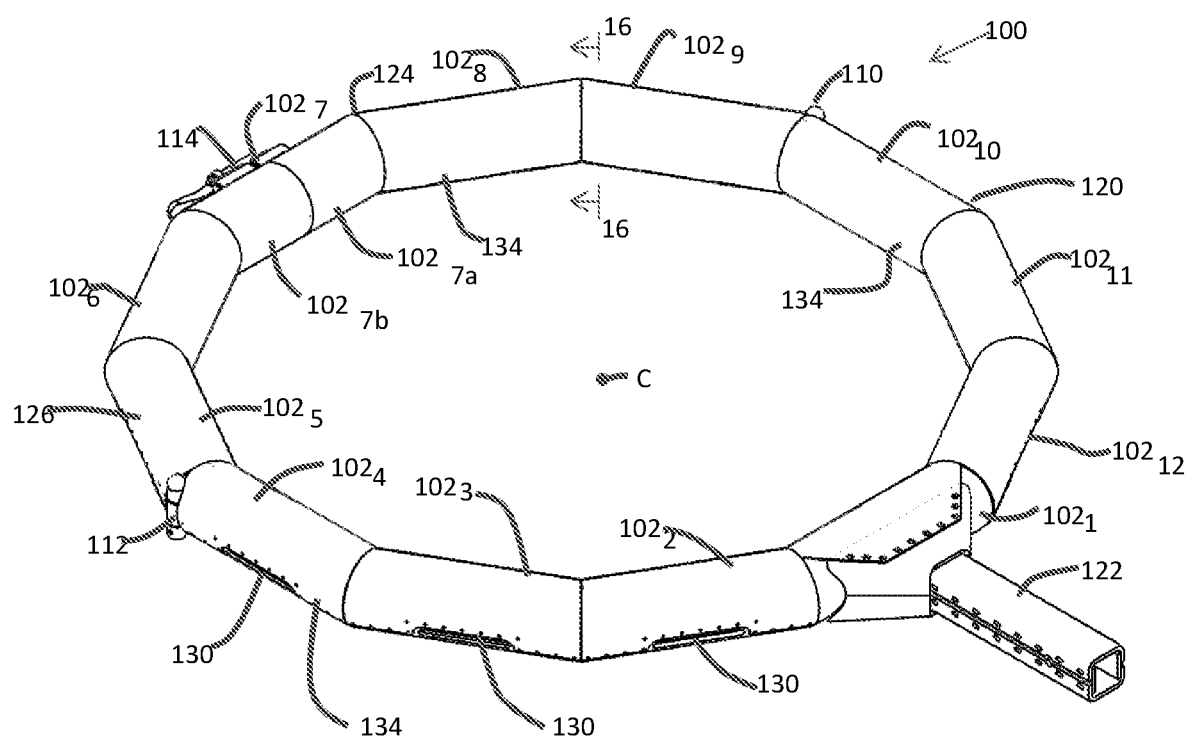
FIG. 11 is a perspective view of a compression ring according to an alternative embodiment of the present invention.
Figure 12:
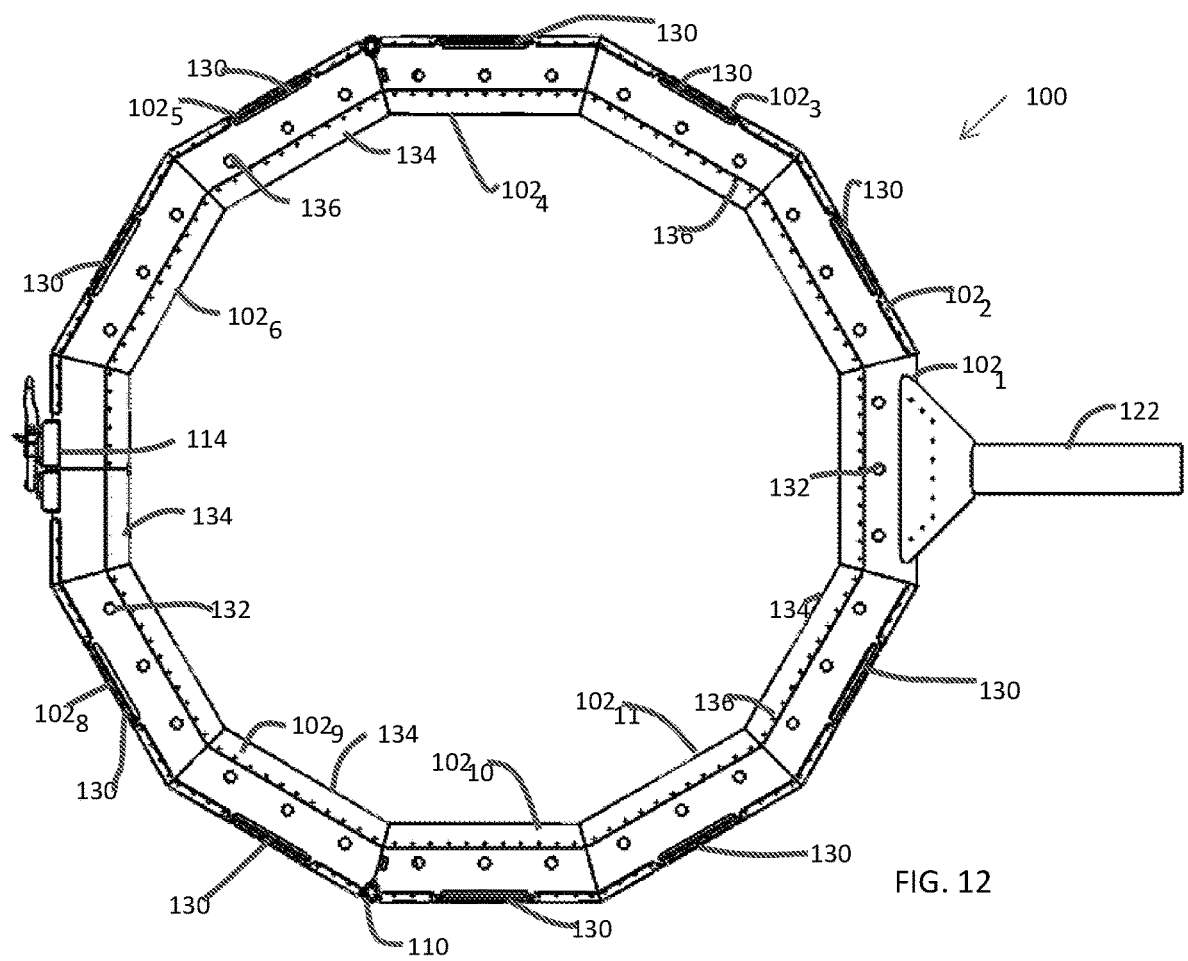
FIG. 12 is a bottom plan view of the compression ring of FIG. 11.

Referring now to FIGS. 11-28, an alternative embodiment of a compression ring 100 is shown. A top perspective view and a bottom elevational view of ring 100 are shown in FIGS. 11 and 12, respectively. Ring 100 is constructed from a plurality of generally linear tubular segments $102_{1-n}$, where "n" is typically a whole number between 8 and 16. In the embodiment shown, twelve segments $102_{1\text{-}12}$ are shown. It is noted that segment $102_7$ is broken into two smaller sections $102_{7a}$ and $102_{7b}$. Ring 100 has an inner portion 103 that faces inwardly, toward the center "C" of ring 100, and an outer portion 105 that faces away from center "C" of ring 100.

Figure 13:
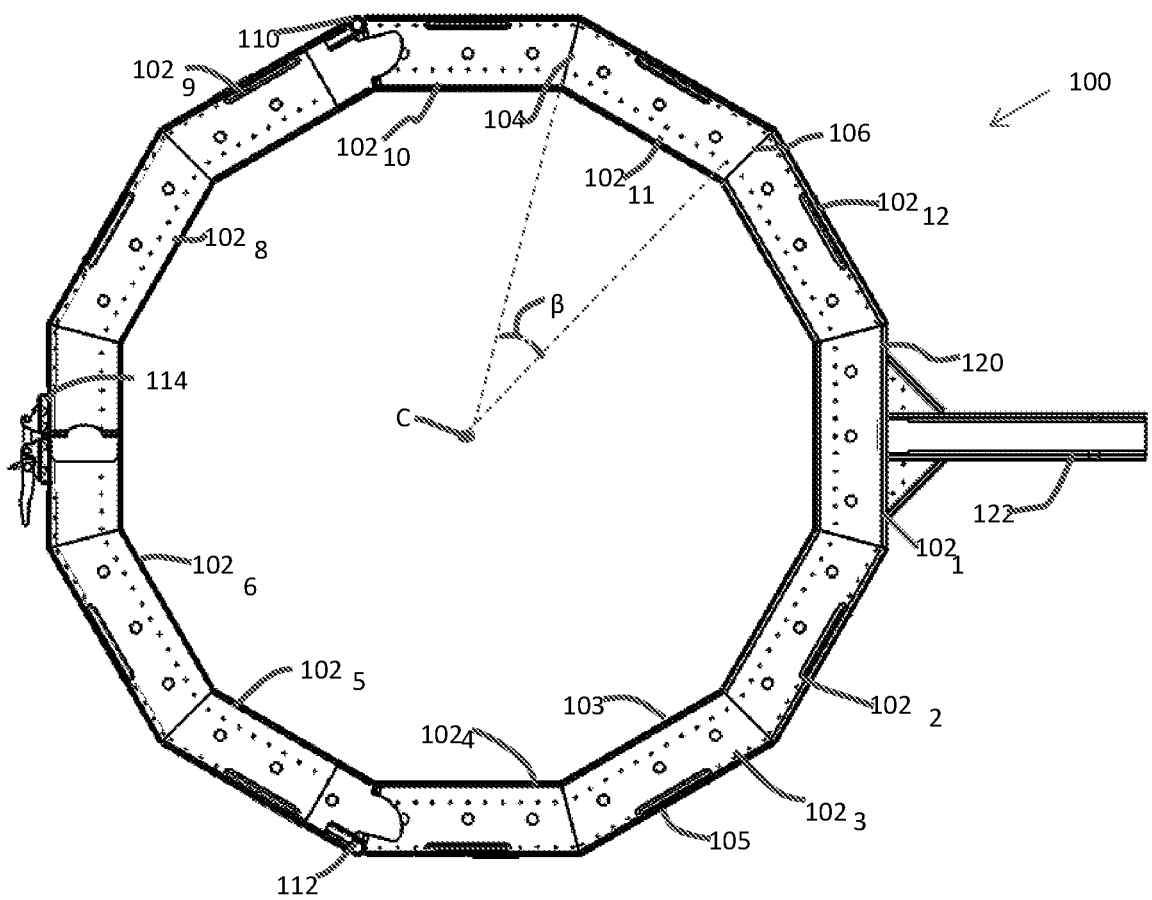
FIG. 13 is a sectional view of the compression ring of FIG. 10.

For simplicity, referring to FIG. 13, only segment $102_{10}$ will be discussed, although the features described immediately below pertain to all segments $102_{1\text{-}12}$. Segment $102_{11}$ has two opposing tapered ends 104, 106 that mate with adjoining segments $102_{10}$, $102_{12}$, respectively. Tapered ends 104, 106 each extend in a plane that extends through the center "C" of ring 100. With 12 segments $102_{1\text{-}12}$, tapered ends 104, 106 define an angle β of about 30 degrees.

Referring now to ring 100 as a whole, ring 100 includes a plurality of hinges 110, 112 and a latch 114. Latch 114 releasably connects sections $102_{7a}$ and $102_{7b}$ to each other. Hinges 110, 112 and latch 114 divide ring 100 into three components: a fixed portion 120 that includes a ring support post 122 sized to fit into rotation arm 20 (shown in FIG. 2); a first swinging portion 124; and a second swinging portion 126. Fixed portion includes segments $102_{1\text{-}4}$ and $102_{10\text{-}12}$ and is bounded at either end by hinges 110, 112. First swinging portion 124 includes segments $102_{7b\text{-}9}$ and is bounded by hinge 110 and latch 114. Second swinging portion 126 includes segments $102_{5\text{-}7a}$ and is bounded by hinge 112 and latch 114.

Figure 14:
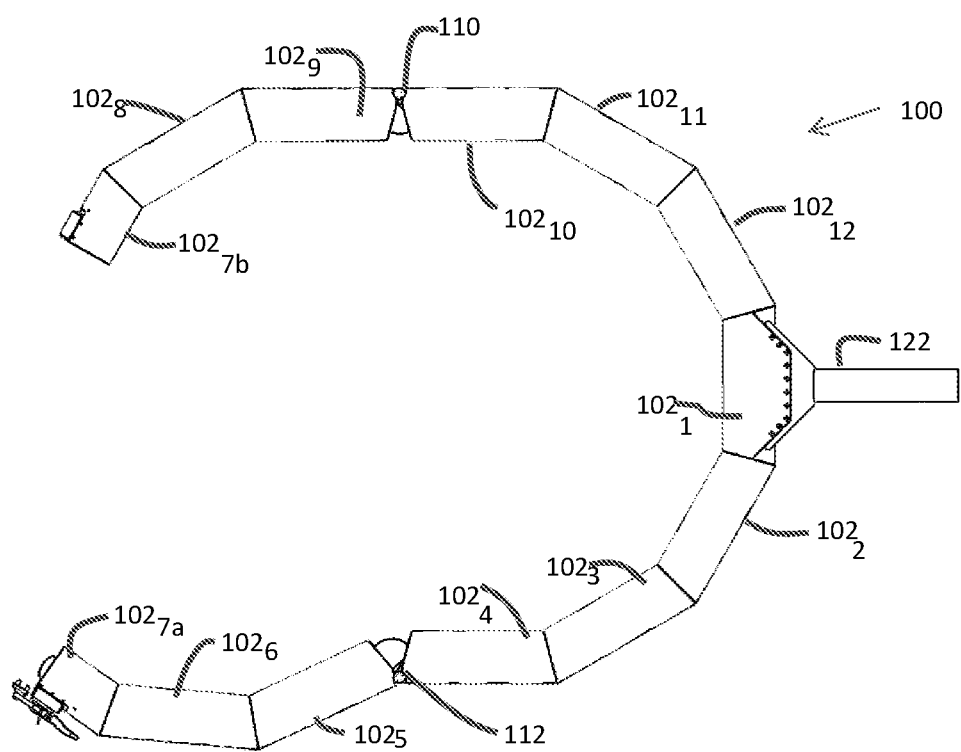
FIG. 14 is a top plan view of the compression ring of FIG. 10 in an open condition.

Latch 114 can be released so that either or both of first and second swinging portions 124, 126 can be pivoted about their respective hinges 110, 112 to a position such as is shown in FIG. 14 so that ring 100 can be advanced around a tree trunk and then closed to the position shown in FIGS. 11-14 so that the tree trunk is located within ring 100.

Each segment $102_{2\text{-}6}$ and $102_{8\text{-}11}$ includes a handle 130 formed therein. Handles 130 are generally oblong slots cut into the respective segments $102_{2\text{-}6}$ and $102_{8\text{-}11}$ to allow a worker to grasp ring 100 and manipulate ring 100 during use. Additionally, as shown in FIG. 12, a plurality of drain holes 132 are provided at the underside of each of segments $102_{1\text{-}6}$ and $102_{8\text{-}12}$. Drain holes 132 allow for the drainage of any water that may enter ring 100 through handles 130.

Each segment $102_{1\text{-}12}$ includes a liner 134 fixedly connected to or attached to its respective segment $102_{1\text{-}12}$, such as, for example, by a plurality of rivets 136. Liner 134 can be the same material as liner 36 described above. Liner 134 provides an important function of drastically reducing the coefficient of friction between the tree and ring 100. Such reduction greatly reduces harm to the branches of the tree as ring 100 is lifted up the height of the tree. Ring 100, when fully assembled, has the general geometry of a toroid having a toroidal direction and a poloidal direction. For reference only, a torus 50 is shown in FIG. 15, with the toroidal direction indicated by line 52 and the poloidal direction indicated by line 54.

Liner 134 extends in the toroidal direction completely around ring 100 when ring 100 is fully assembled (as shown in FIGS. 11 and 12), and partially in the poloidal direction, with the portion in the poloidal direction covered by liner 134 being the portion in the poloidal direction facing inwardly toward the center "C" of ring 100 and upwardly over the top of each segment $102_{1\text{-}12}$, as shown in FIG. 11. In an exemplary embodiment, as shown in the end view of segment $102_8$, shown in FIG. 16, liner 134 extends about 270 degrees in the poloidal direction of ring 25. In an alternative exemplary embodiment, liner 134 can extend about 180 degrees in the poloidal direction of ring 100.

Figure 15:
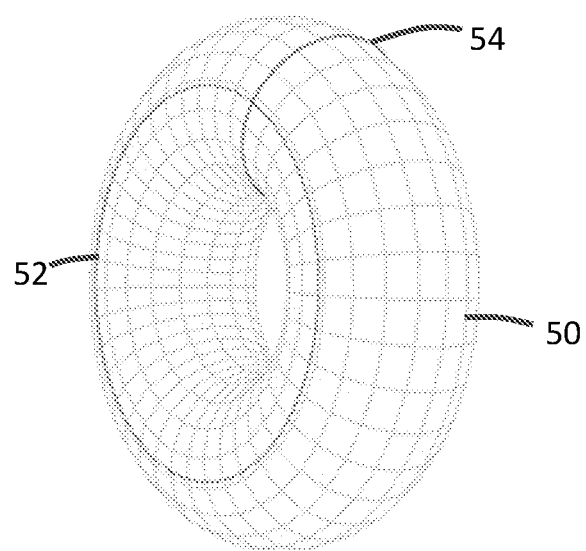
FIG. 15 is a perspective view of a torus, with lines depicting toroidal and poloidal directions.
Figure 16:
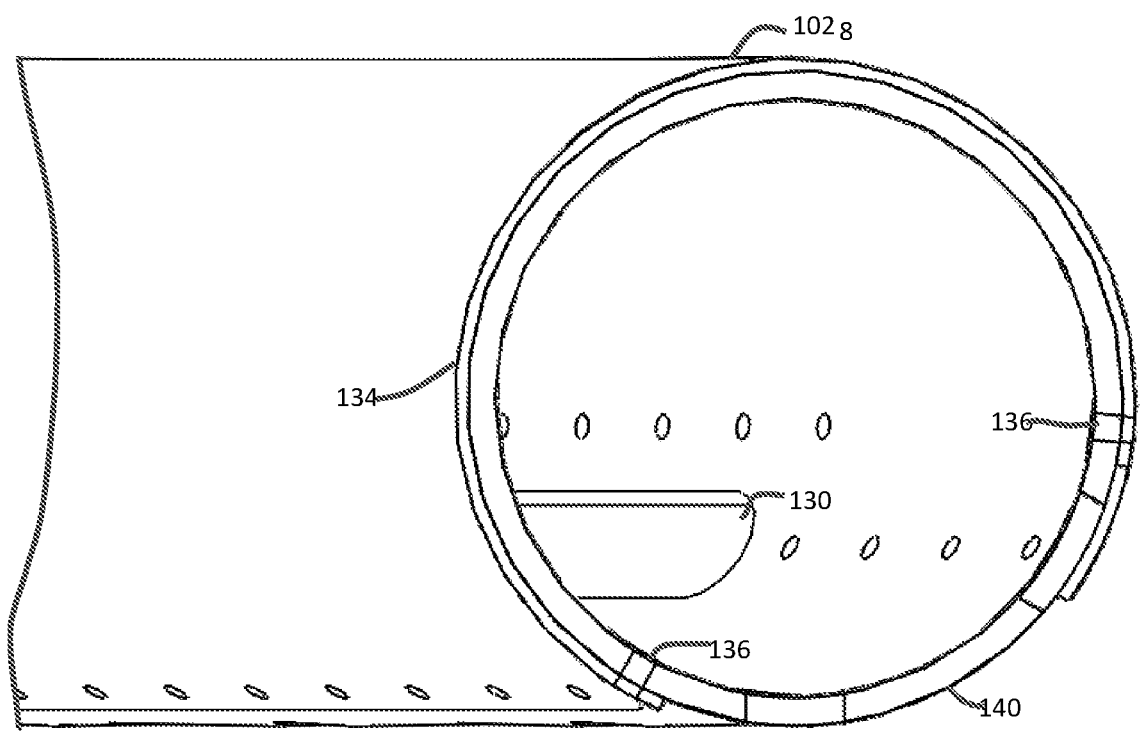
FIG. 16 is a sectional view of the compression ring of FIG. 11, taken along lines 16-16 of FIG. 11.

In either embodiment, a remaining area 140 around each segment $102_{2\text{-}6}$ and $102_{8\text{-}11}$, identified as area 136 in FIG. 15, is intentionally bereft of liner 134. Because of the low coefficient of friction of liner 134, if liner 134 was provided completely around the poloidal direction of ring 100, workers would have a difficult time grasping ring 100, making a potentially dangerous condition for the workers. By intentionally omitting liner 134 along the area around ring 100 identified as area 136, the workers can grasp the ring 100 and maneuver the ring 100 around a tree.

Figure 17:
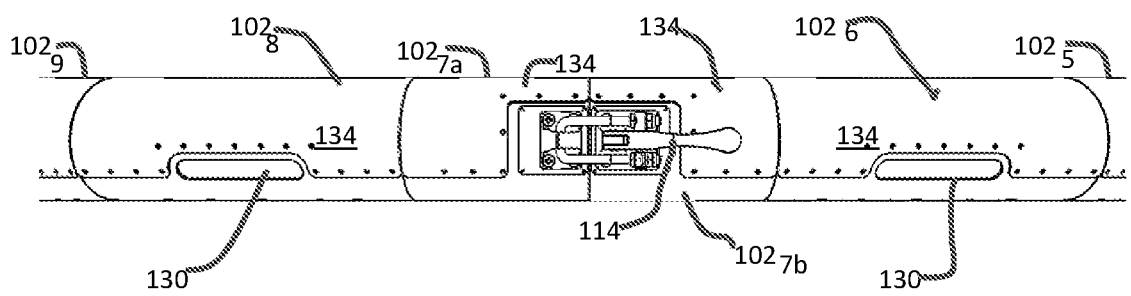
FIG. 17 is a front elevational view of the compression ring of FIG. 11, showing a latch.
Figure 18:
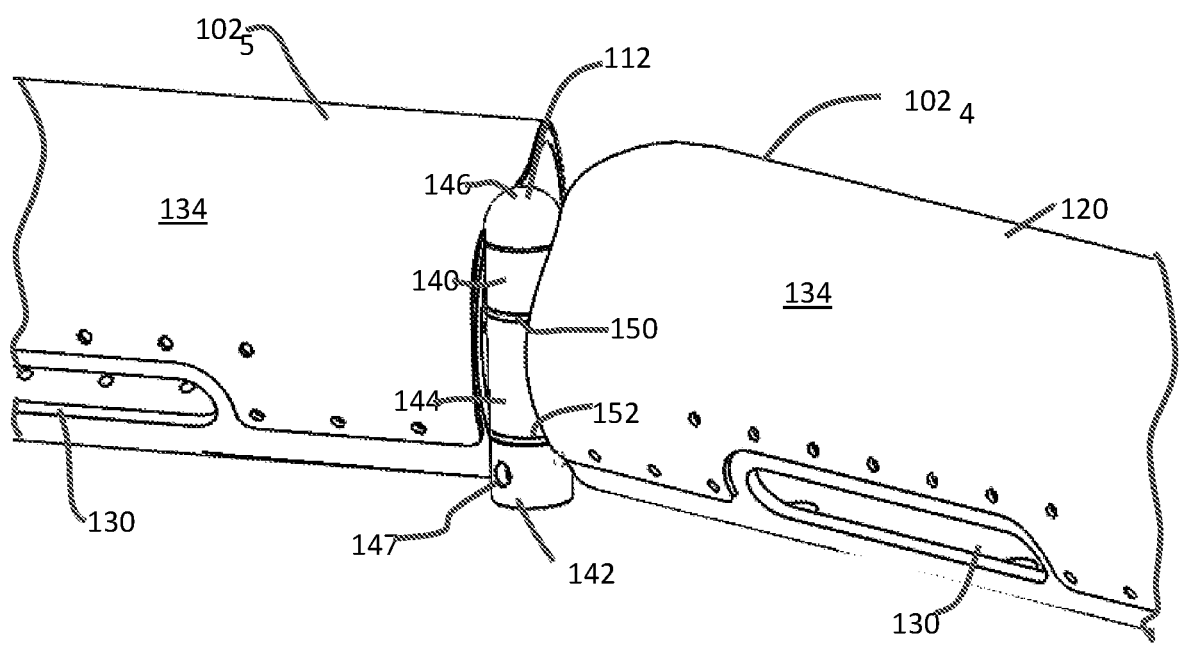
FIG. 18 is an enlarged perspective view of an exterior portion of the compression ring of FIG. 11, showing a hinge.

As shown in FIG. 17, liner 134 extends around latch 114 as well as around the top portion of handles 130. As mentioned above, liner 134 is intentionally omitted on portions of ring 100 below handles 130 as well as latch 114 in order to provide workers with a better purchase on ring 100 if the worker's hands do not reach into handles 130.

Referring now to FIGS. 18-21, hinge 112 is shown. Hinge 112 is similar to hinge 110, so only hinge 112 need be explained. Hinge 112 hingedly connects segments $102_4$ and $102_5$ to each other so that swinging portion 126 can pivot relative to fixed portion 120 as shown in FIG. 14.

Hinge 112 includes a top end 140 and a bottom end 142 that are fixed to segment $102_4$ and a middle portion 144, between top end 140 and bottom end 142, that is fixed to segment $102_5$. A pin 146 extends through top end 140, middle portion 144, and bottom end 142, holding hinge 112 together and allowing hinge 112 to open and close.

Pin 146 does not rotate. A through-opening 147 in bottom end 142 allows a screw (not shown) to be inserted therethrough to engage pin 146 and prevent pin 146 from rotating.

Hinge 112 includes a pair of wear/thrust bushings 150, 152. Bushing 150 is located between top end 140 and middle portion 144, while bushing 152 is located between middle portion 144 and bottom end 142. Bushings 150, 152 are provided to reduce/prevent wear on top end 140, bottom end 142, and middle portion 144 and can be made of a relatively soft material, such as bronze. Bushings 150, 152 lubricate hinge 112 and can be readily replaced upon excessive wear, without damage to the remainder of hinge 112. Optionally, a grease fitting 154, shown in FIGS. 19 and 20 can be added to middle portion 144 to allow lubrication of hinge 112. It is desired that grease fitting 154 be located on an interior portion of hinge 112 to reduce or eliminate grease contaminating the exterior of hinge 112 or ring 100.

Figure 21:
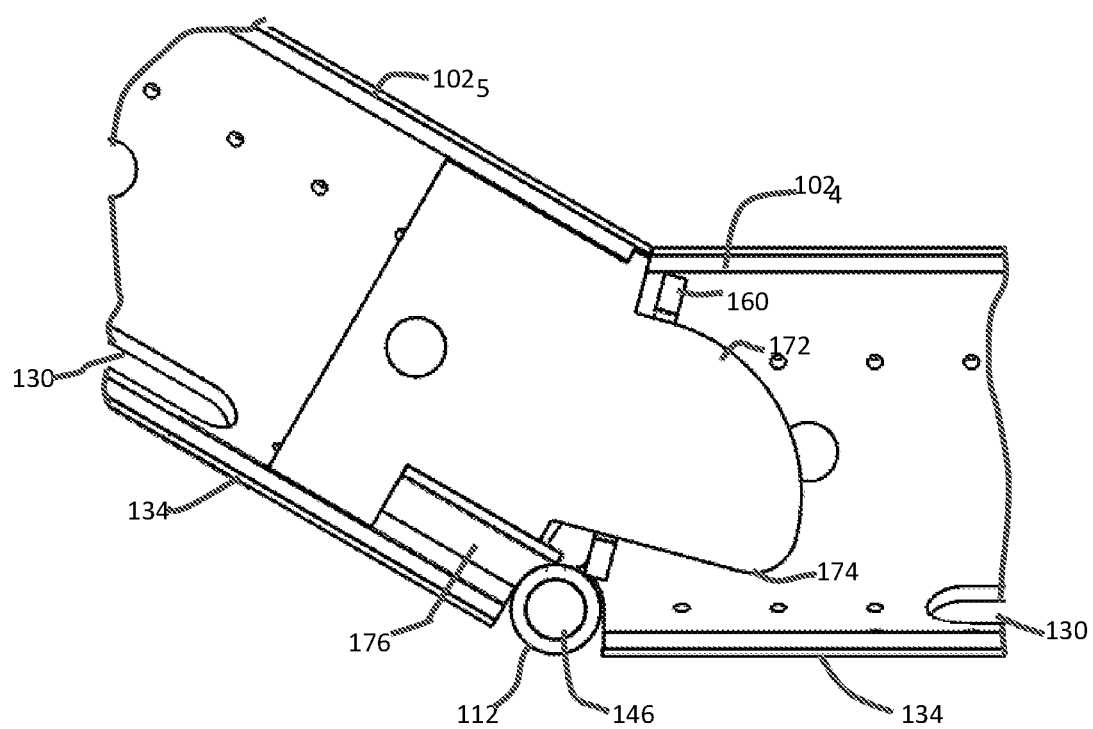
FIG. 21 is a top plan view, in section, of the hinge portion of the compression ring shown in FIG. 20.
Figure 22:
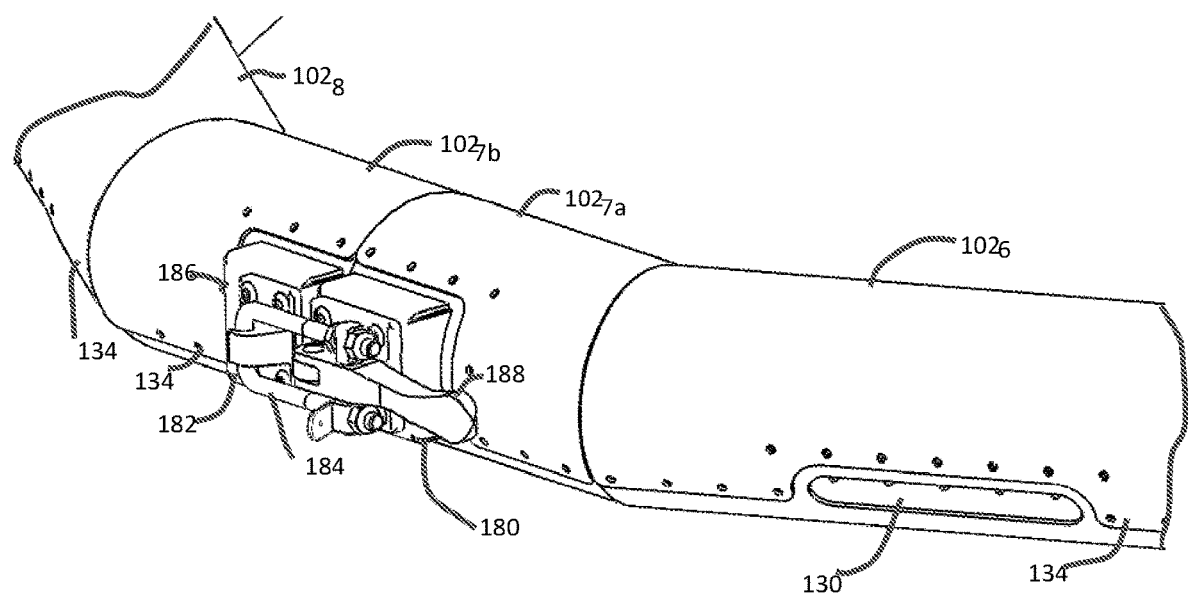
FIG. 22 is a perspective view of the front portion of the compression ring of FIG. 11, showing the latch of FIG. 17.
Figure 23:
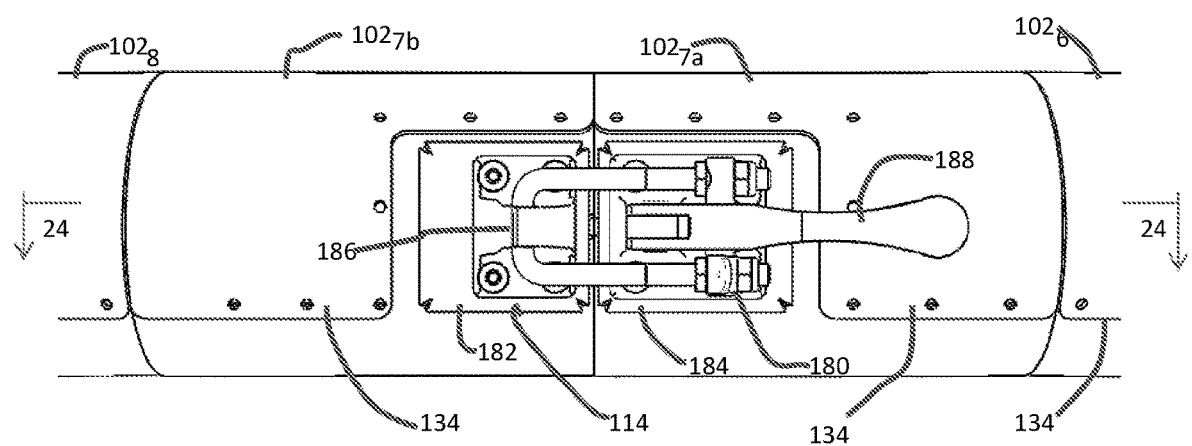
FIG. 23 is an enlarged partial front elevational view of the compression ring of FIG. 11, showing the latch.
Figure 24:
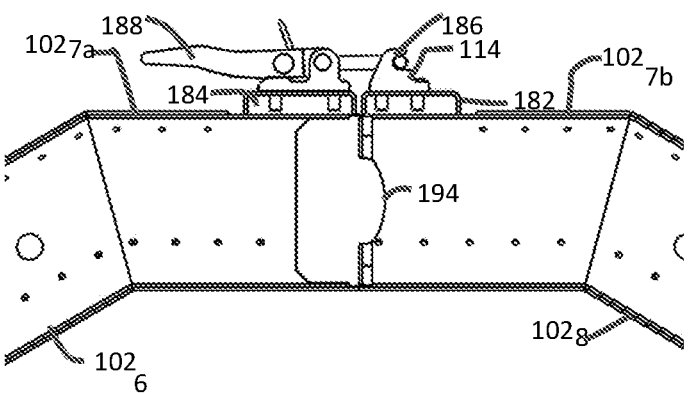
FIG. 24 is a top plan view, in section of the partial front elevational view of the compression ring of FIG. 11, taken along lines 24-24 of FIG. 23.

Segment $102_4$ includes a plate 160 that extends generally vertically with respect to segment $102_4$ at hinge 112. Plate 160 includes a horizontal elongated groove 162 that is located approximately in the center of plate 160. Groove 162 is sized and shaped to accept a tongue 170 that is fixed to segment $102_5$. As shown in FIG. 21, tongue 170 has an arcuate internal surface 172 and a generally straight external surface 174. Arcuate surface 172 allows tongue 170 to rotate through groove 162 as segment $104_5$ pivots with respect to segment $102_4$. Tongue 170 is sufficiently long such that, even when segment $102_5$ is pivoted a maximum amount relative to segment $102_4$, at least a portion of tongue 170 remains inside groove 162 to assist in keeping swinging portion 126 aligned relative to fixed portion 120.

Figure 19:
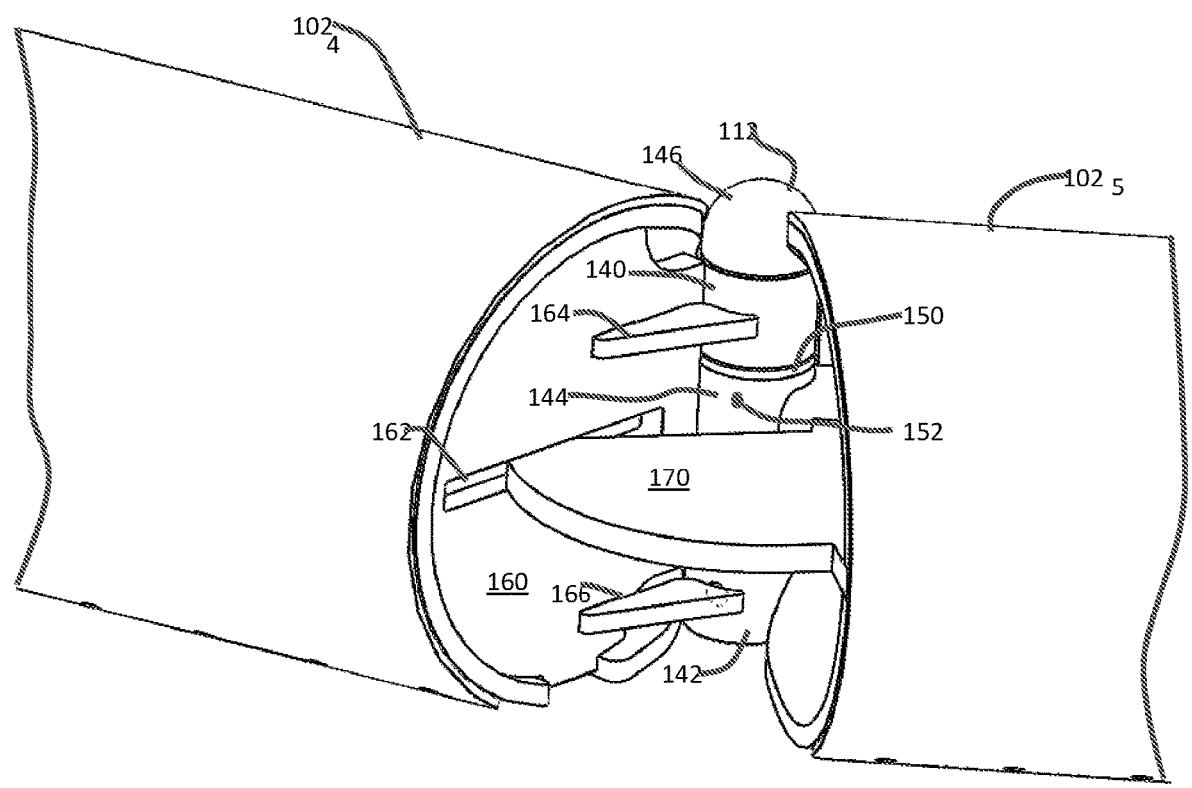
FIG. 19 is an enlarged perspective view of an interior portion of the compression ring of FIG. 11, showing the hinge of FIG. 18.
Figure 20:
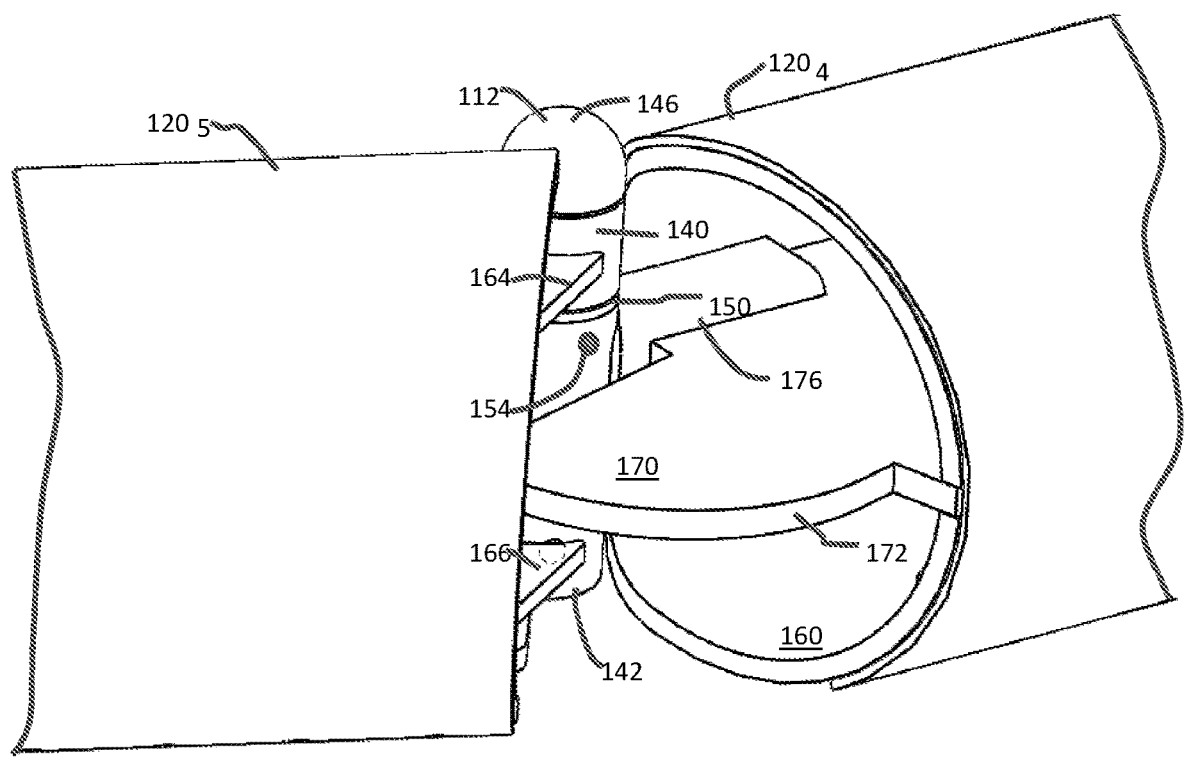
FIG. 20 is an enlarged perspective view of an interior portion of the compression ring of FIG. 11 from a different angle, showing the hinge of FIG. 18.

Referring to FIG. 19, top end 140 of hinge 112 is fixed to plate 160 via a top gusset 164 and bottom end 142 is fixed to plate 160 via a bottom gusset 166. Additionally, referring to FIGS. 20 and 21, a stiffener 174 extends from the interior of segment $102_5$ to support tongue 160.

Referring now to FIGS. 22-26, latch 114 will be described in detail. Latch 114 can be a commercially available latch, such as, for example, for example, a Model 385-L latch manufactured by DESTACO of Auburn Hills, Mich. 48326. Latch 114 has an active portion 180 fixed to segment $102_{7a}$ and a passive portion fixed to segment $102_{7b}$. Active portion 180 includes a U-bolt 184 that is movable to capture a tang 186 on passive portion 182 and secure U-bolt 184 against tang 186 with a lever 188. Lever 188 can be released to separate active portion 180 from passive portion 182 and allow first swinging portion 124 and second swinging portion 126 to pivot open with respect to fixed portion 120.

Similar to segments $102_4$ and $102_5$ on either side of hinge 112, segment $1027_b$ includes a plate 190 that extends generally vertically with respect to segment $102_{7b}$ at passive portion 182. Plate 190 includes a horizontal elongated groove 192 that is located approximately in the center of plate 190. Groove 192 is sized and shaped to accept a tongue 194 that is fixed to segment $102_{7a}$. Tongue includes a stiffening portion 195 that provides additional structural strength to ring 100 at latch 114. Tongue 194 engages with groove 192 when segments $102_{7a}$ and $102_{7b}$ are pivoted together in order to further add structural strength to ring 100 in the closed position.

Figure 28:
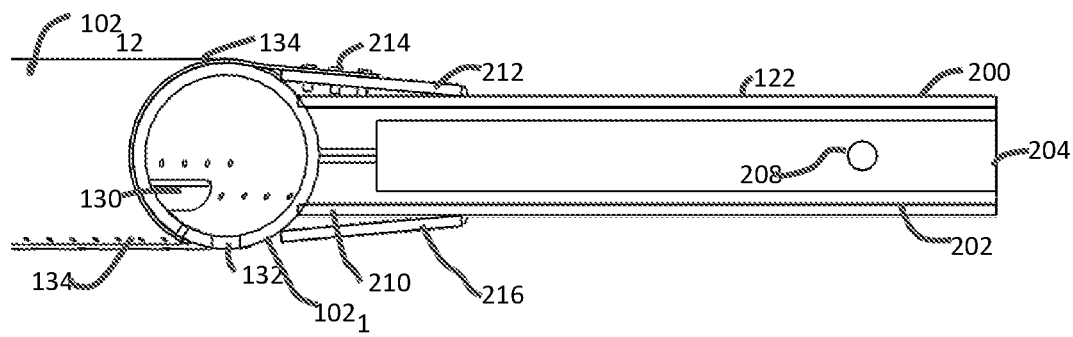
FIG. 28 is a sectional view of the rear portion of the compression ring, taken along lines 28-28 of FIG. 27.
Figure 25:
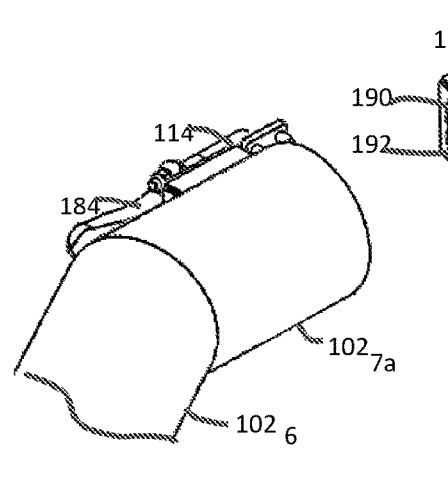
FIG. 25 is a left perspective view of the front portion of the compression ring of FIG. 11, with the latch and ring in an open position.
Figure 26:
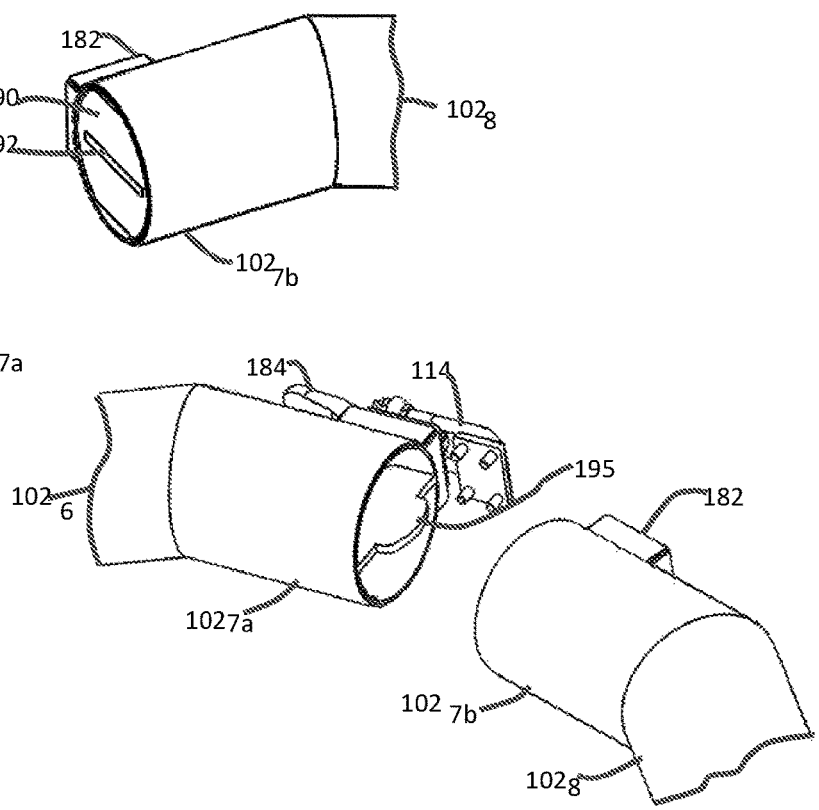
FIG. 26 is a right perspective view of the front portion of the compression ring of FIG. 11, with the latch and ring in an open position.
Figure 27:
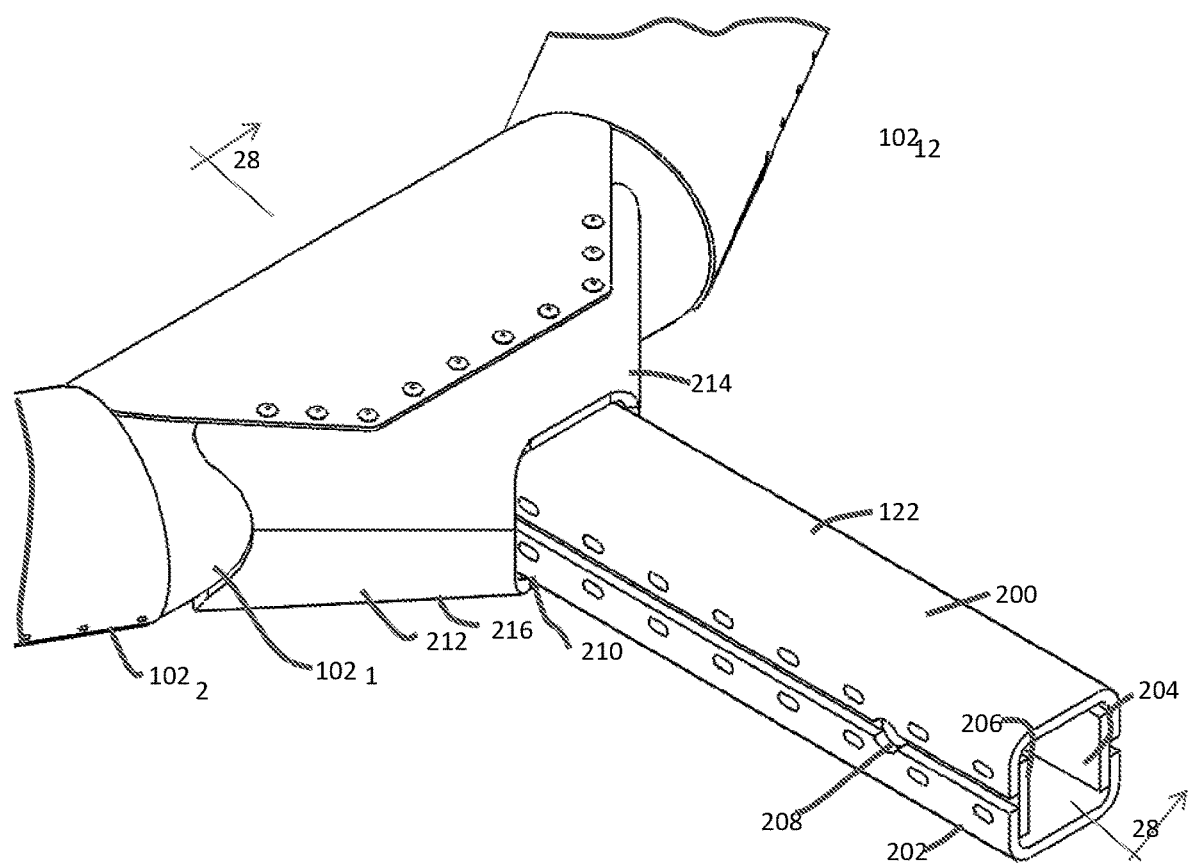
FIG. 27 is a perspective view of a rear portion of the compression ring of FIG. 11.

Referring now to FIGS. 27 and 28, segment $102_1$, with ring support post 122, is shown. Post 122 is generally a box channel having an upper inverted U-shaped leg 200 and a lower U-shaped leg 202, which are connected to each other by opposing stiffeners 204, 206.

Ring support post 122 is sized and shaped to be releasably retained by rotation arm 20. A slot 208 extends laterally through ring support post 122 to enable a bolt (not shown) to extend thereinto to retain post 122 by rotation arm 20.

A fixed end 210 extends to and is connected to segment $102_1$. Fixed end 210 can be welded to segment $102_1$ to provide a strong connection. To enhance this connection, a sleeve 212 is provided over the connection between fixed end 210 and segment $102_1$. Sleeve 212 includes an upper portion 214 and a lower portion 216. Rather than curve around an outer poloidal portion of segment $102_1$, for segment $102_1$, liner 134 is fixedly connected to upper portion 212 of sleeve 212.

To operate ring 100, ring 100 is advanced toward a tree. Latch 114 is unlatched and first swinging portion 124 and second swinging portion 126 are pivoted about their respective hinges 110, 112 to allow ring 100 to be advanced such that the tree is located generally around the center "C" of ring 100. First and second swinging portions 124, 126 are then pivoted back to the closed position so that latch 114 can be latched. Ring 100 is then operated similarly to ring 25 as described above.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A standing tree baling apparatus, comprising:
   a main frame;
   a boom pivotably connected to the main frame, the boom having a first end and a second end;
   a boom lifter connected between the main frame and the boom for raising and lowering the boom about a pivot joint at the first end of the boom;
   a rotation arm having a first arm end and a second arm end, the rotation arm being pivotably connected to the second end of the boom at the first arm end;
   drive means for pivoting the arm relative to the boom; and
   a compression ring sized for loosely encircling a trunk of a standing tree and adapted for forcibly moving a succession of branches of the tree non-destructively inward toward the trunk of the tree as the ring is raised about the tree to facilitate baling of the tree with rope line, the ring being connected to the second arm end.

2. The apparatus of claim 1, further including a ring liner releasably affixed to an external operative surface of the ring, the ring liner composed of a material having a coefficient of friction less than that of the material of the ring.

3. The apparatus of claim 2, wherein the ring liner is composed of a polyethylene polymer plastic.

4. The apparatus of claim 3, wherein the ring liner is composed of a compressible and resilient material.

5. The apparatus of claim 1, wherein the compression ring includes a plurality of segments, wherein at least one of the segments is movable to provide an opening in the ring for receiving the tree trunk.

6. The apparatus of claim 1, wherein the rotation arm is downwardly extendable when the boom is at its lowest position whereby the ring is positionable horizontally below a level of the boom.

7. The apparatus of claim 6, wherein the drive means for rotating the arm relative to the boom is mounted on the arm.

8. The apparatus of claim 7, wherein the ring is positionable between the boom and the main frame in an inwardly folded state.

9. The apparatus of claim 1, further comprising a lifting means attached to the boom; and
   wherein the compression ring comprises:
   a first section defining an arc of greater than 180 degrees, wherein the first section is connected to the lifting means, wherein the first section further comprises a first ring liner extending only partially around an exterior of the first section such that the first ring liner does not extend along a bottom portion of the first section; and
   a second section defining an arc of less than 180 degrees such that the second section is connectable to the first section to define a complete perimeter, wherein the second section is not connected to any lifting means, wherein the second section further comprises a second ring liner extending only partially around an exterior of the second section such that the second ring liner does not extend along a bottom portion of the second.

10. The apparatus according to claim 1, wherein the compression ring comprises:
    a cross section and a perimeter defining the cross section; and
    a ring liner affixed to the perimeter, the liner extending less than 360 degrees around the perimeter such that the liner does not extend along a bottom portion of the ring.

11. A tree branch compression apparatus comprising:
    a main frame;
    a boom pivotably connected to the main frame at a pivot joint adjacent a leading end of the main frame and a first end of the boom;
    a rotation arm pivotably connected to a second end of the boom at a first end of the arm; and
    a compression ring sized for loosely encircling a trunk of a standing tree and adapted to forcibly moving branches of the tree inwardly toward the trunk of the tree as the compression ring is raised vertically about the tree to facilitate baling of the tree with rope line, the compressing ring being rotatable connected to a second end of the arm.

12. The apparatus of claim 11, further including a ring liner releasably affixed around an external operative surface of the ring, the liner composed of a material having a coefficient of friction less than a material of the ring.

13. The apparatus of claim 12 further including a boom lifter connected between the main frame and the boom for raising and lowering the boom about the pivot joint.

14. The apparatus of claim 13, further including means for pivoting the arm relative to the boom.

15. The apparatus according to claim 12, wherein the ring liner extends across a top portion of the ring.

16. The apparatus according to claim 11, further comprising a lifting means attached to the boom;
wherein the compression ring comprises:
   a first section defining an arc of greater than 180 degrees, wherein the first section is connected to the lifting means, wherein the first section further comprises a first ring liner extending only partially around an exterior of the first section such that the first ring liner does not extend along a bottom portion of the first section; and
   a second section defining an arc of less than 180 degrees such that the second section is connectable to the first section to define a complete perimeter, wherein the second section is not connected to any lifting means, wherein the second section further comprises a second ring liner extending only partially around an exterior of the second section such that the second ring liner does not extend along a bottom portion of the second section,
wherein the first section comprises a first latching portion and wherein the second section comprises a second latching portion adapted to engage the first latching portion to releasably secure the first section to the second section.

17. The apparatus according to claim 16, wherein the first ring liner extends across a top portion of the first section.

18. The apparatus according to claim 17, wherein the second ring liner extends across a top portion of the second section.

19. The apparatus according to claim 11, wherein the first ring liner extends greater than 180 degrees around a perimeter of the compression ring.

20. The apparatus according to claim 11, wherein the compression ring is constructed from a first section defining an arc of greater than 180 degrees and a second section defining an arc of less than 180 degrees such that the second section is connectable to the first section to define a complete perimeter.

* * * * *